United States Patent [19]

Ueno

[11] Patent Number: 5,572,377
[45] Date of Patent: Nov. 5, 1996

[54] PITCH CONTROL APPARATUS FOR SOUND REPRODUCING SYSTEM

[75] Inventor: Noriyuki Ueno, Tokyo, Japan

[73] Assignee: Sony Corporation, Tokyo, Japan

[21] Appl. No.: 377,821

[22] Filed: Jan. 25, 1995

[30] Foreign Application Priority Data

Jan. 28, 1994 [JP] Japan .................. 6-024893
Jan. 28, 1994 [JP] Japan .................. 6-024894

[51] Int. Cl.⁶ .................. G11B 27/36; G11B 7/00
[52] U.S. Cl. .................. 360/31; 360/8; 360/32; 360/65; 360/73.08; 369/54; 369/124
[58] Field of Search .................. 360/8, 32, 61, 360/25, 71, 73.01, 73.03, 73.04, 73.08, 51, 65, 46, 31; 369/86, 88, 54, 124

[56] References Cited

U.S. PATENT DOCUMENTS

| | | | |
|---|---|---|---|
| 4,020,291 | 4/1977 | Kitamura et al. | 360/8 X |
| 4,348,699 | 9/1982 | Tsuchiya et al. | 360/32 |
| 4,406,001 | 9/1983 | Klasco et al. | 360/8 X |
| 4,418,366 | 11/1983 | Moriya | 360/75 |
| 4,734,795 | 3/1988 | Fukami et al. | 360/8 |
| 4,831,466 | 5/1989 | Murakami et al. | 360/31 X |
| 5,392,163 | 2/1995 | Higuchi et al. | 360/65 X |

FOREIGN PATENT DOCUMENTS

| | | |
|---|---|---|
| 0480483 | 11/1987 | European Pat. Off. . |
| 0324126 | 12/1988 | European Pat. Off. . |
| 0413458 | 7/1990 | European Pat. Off. . |

*Primary Examiner*—Andrew L. Sniezek
*Attorney, Agent, or Firm*—Jay H. Maioli

[57] ABSTRACT

In a recording medium playback device, such as a tape recorder, the playback speed is changed from the speed used during recording but the sounds and voices being reproduced can be listened to at the normal pitch, as if the playback tape speed was the same as the recording speed. A frequency generator (FG) system is not required and the playback signal is converted in pitch based on a capstan motor drive signal that is converted to a voltage value and that controls a pitch converting circuit. Alternatively, the pitch converting circuit is controlled by a signal derived from a speed control system, whereby the capstan motor speed is controlled by the user of the tape recorder. By converting the pitch of the playback signal in this way a recording of a conference, for example, can be scanned at high speed yet the reproduced voices are provided with a normal pitch.

14 Claims, 22 Drawing Sheets

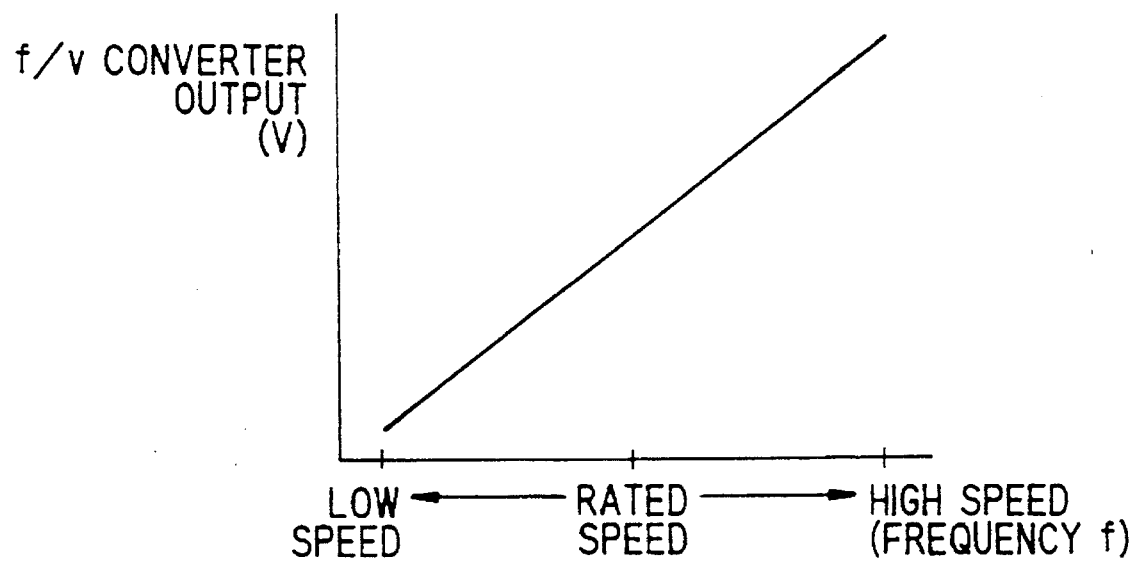

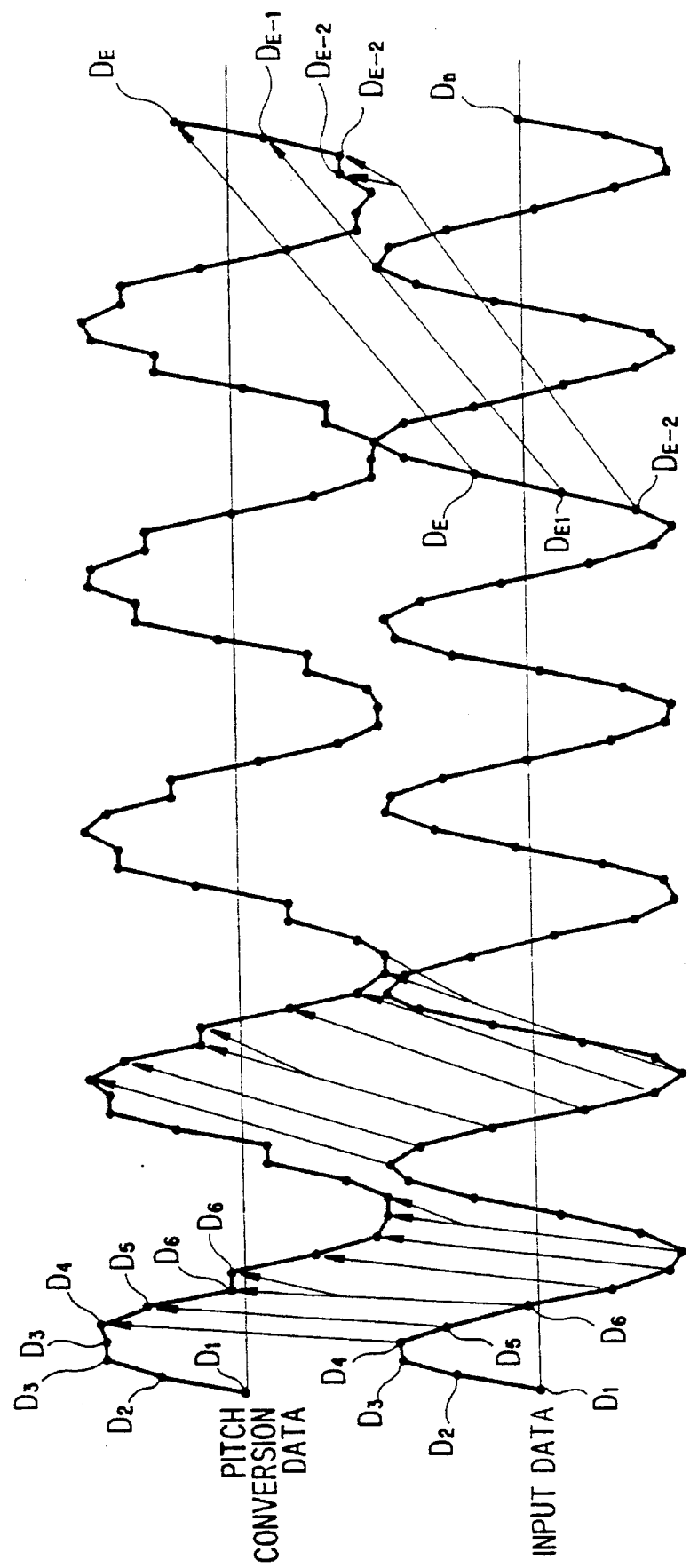

FIG. 12

| (a) SPI TERMINAL VOLTAGE | | (b) PITCH CONVERTING AMOUNT (TONE) | (c) FREQUENCY CHANGE FOR PITCH CONVERSION ±0 | (d) FREQUENCY CHANGE RATE FOR PITCH CONVERSION INTO RATED FREQUENCY | (e) MOTOR ROTATION SPEED (rpm) | |
|---|---|---|---|---|---|---|
| *VDD32 | VDD=3.5V(SPT) | | | | | |
| 32 ~ 31 | 3.50 ~ 3.39 | 6 | 100.00% | -50.00% | 1000 | |
| 31 ~ 30 | 3.39 ~ 3.28 | 5.5 | 88.77% | -47.03% | 1059 | |
| 30 ~ 29 | 3.28 ~ 3.17 | 5 | 78.18% | -43.88% | 1122 | |
| 29 ~ 28 | 3.17 ~ 3.06 | 4.5 | 68.18% | -40.54% | 1189 | |
| 28 ~ 27 | 3.06 ~ 2.95 | 4 | 58.74% | -37.00% | 1260 | |
| 27 ~ 26 | 2.95 ~ 2.84 | 3.5 | 49.83% | -33.26% | 1335 | |
| 26 ~ 25 | 2.84 ~ 2.73 | 3 | 41.42% | -29.29% | 1414 | |
| 25 ~ 24 | 2.73 ~ 2.63 | 2.5 | 33.48% | -25.08% | 1498 | |
| 24 ~ 23 | 2.63 ~ 2.52 | 2 | 25.99% | -20.63% | 1587 | |
| 23 ~ 22 | 2.52 ~ 2.41 | 1.5 | 18.92% | -15.91% | 1682 | |
| 22 ~ 21 | 2.41 ~ 2.30 | 1 | 12.25% | -10.91% | 1782 | |
| 21 ~ 20 | 2.30 ~ 2.19 | 0.5 | 5.95% | -5.61% | 1888 | |
| 20 ~ 19 | 2.19 ~ 2.08 | ±0 | 0.00% | 0.00% | 2000 | DURING RATED REPRODUCTION |
| 19 ~ 18 | 2.08 ~ 1.97 | -0.5 | -5.61% | 5.95% | 2119 | |
| 18 ~ 17 | 1.97 ~ 1.86 | -1 | -10.91% | 12.25% | 2245 | |
| 17 ~ 16 | 1.86 ~ 1.75 | -1.5 | -15.91% | 18.92% | 2378 | |
| 16 ~ 15 | 1.75 ~ 1.64 | -2 | -20.63% | 25.99% | 2520 | |
| 15 ~ 14 | 1.64 ~ 1.53 | -2.5 | -25.08% | 33.48% | 2670 | |
| 14 ~ 13 | 1.53 ~ 1.42 | -3 | -29.29% | 41.42% | 2828 | |
| 13 ~ 12 | 1.42 ~ 1.31 | -3.5 | -33.26% | 49.83% | 2997 | |
| 12 ~ 11 | 1.31 ~ 1.20 | -4 | -37.00% | 58.74% | 3175 | |
| 11 ~ 10 | 1.20 ~ 1.09 | -4.5 | -40.54% | 68.18% | 3363 | |
| 10 ~ 9 | 1.09 ~ 0.98 | -5 | -43.88% | 78.18% | 3564 | |
| 9 ~ 8 | 0.98 ~ 0.88 | -5.5 | -47.03% | 88.77% | 3775 | |
| 8 ~ 7 | 0.88 ~ 0.77 | -6 | -50.00% | 100.00% | 4000 | |
| 7 ~ 6 | 0.77 ~ 0.66 | -6.5 | -52.81% | 111.89% | 4238 | |
| 6 ~ 5 | 0.66 ~ 0.55 | -7 | -55.46% | 124.49% | 4490 | |
| 5 ~ 4 | 0.55 ~ 0.44 | -7.5 | -57.96% | 137.84% | 4757 | |
| 4 ~ 3 | 0.44 ~ 0.33 | -8 | -60.31% | 151.98% | 5040 | |
| 3 ~ 2 | 0.33 ~ 0.22 | -8.5 | -62.54% | 166.97% | 5339 | |
| 2 ~ 1 | 0.22 ~ 0.11 | -9 | -64.64% | 182.84% | 5657 | |
| 1 ~ 0 | 0.11 ~ 0.00 | ±0 | -0.00% | 0.00% | | |

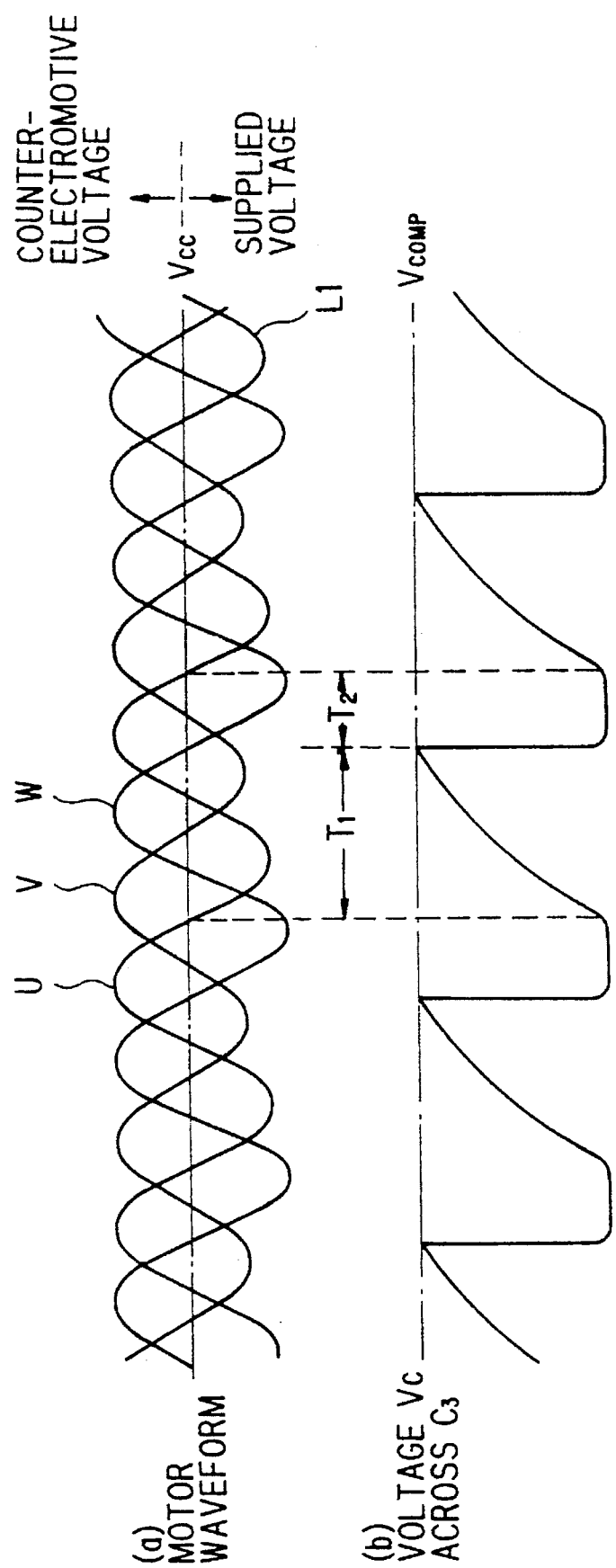

| VOLUME MO-VING AMOUNT | RESISTANCE VALU : MAX=100KΩ | T1(mSEC) | F1(Hz) | ROTATION CHANGE RATE |
|---|---|---|---|---|
| 0% | 0 | 0.51 | 1305.08 | 600% |
| 10% | 10 | 1.02 | 652.54 | 300% |
| 20% | 20 | 1.53 | 435.03 | 200% |
| 30% | 30 | 2.04 | 326.27 | 150% |
| 40% | 40 | 2.55 | 261.02 | 120% |
| 50% | 50 | 3.06 | 217.51 | 100% |
| 60% | 60 | 3.58 | 186.44 | 86% |
| 70% | 70 | 4.09 | 163.13 | 75% |
| 80% | 80 | 4.60 | 145.01 | 67% |
| 90% | 90 | 5.11 | 130.51 | 60% |
| 100% | 100 | 5.62 | 118.64 | 55% |

$R_{100} = 10K\Omega$
$V_{COMP} = 0.6V$
$C_{100} = 0.1\mu F$
$E = 1.5V$

FIG.20A
| VOLUME MOVING AMOUNT | CHARGING VOLTAGE | T1(mSEC) | F1(Hz) | ROTATION CHANGE RATE |
|---|---|---|---|---|
| 0% | 2.5 | 1.74 | 382.37 | 178% |
| 10% | 2.3 | 1.91 | 348.94 | 162% |
| 20% | 2.1 | 2.11 | 315.49 | 147% |
| 30% | 1.9 | 2.36 | 282.02 | 131% |
| 40% | 1.7 | 2.68 | 248.51 | 116% |
| 50% | 1.5 | 3.10 | 214.95 | 100% |
| 60% | 1.3 | 3.68 | 181.30 | 84% |
| 70% | 1.1 | 4.52 | 147.50 | 69% |
| 80% | 0.9 | 5.88 | 113.42 | 53% |
| 90% | 0.7 | 8.47 | 78.68 | 37% |
| 100% | 0.5 | 16.09 | 41.42 | 19% |
R=100KΩ
$V_{COMP}$=0.4V
C=0.1μF
FIG.20B
FIG.20C
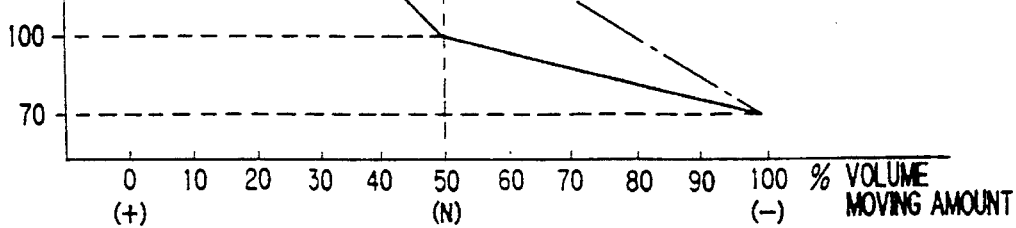

PITCH CONTROL APPARATUS FOR SOUND REPRODUCING SYSTEM

BACKGROUND OF THE INVENTION

1. Field of the Invention

The present invention relates generally to a sound reproducing apparatus such as a tape recorder and, more specifically, to a playback apparatus capable of performing a pitch conversion of an audio signal reproduced at a speed other than the speed at which it was recorded.

2. Description of the Background

In electronic appliances, for instance, tape recorders and tape players, not only is the rotation frequency or number of revolutions of the motor controlled to drive the magnetic tape at the rated tape speed, but the rotation frequency of the motor also can be varied in response to a variable tape speed operation performed by the user.

Furthermore, in some other electronic appliances there is provided a pitch or frequency converting process that is carried out with respect to the reproduced audio signal from the magnetic tape and the like in accordance with a pitch converting amount provided by the user, thereby increasing or decreasing musical intervals, that is, the pitch of the sounds, in the reproduced sound signal.

On the other hand, when the tape drive speed is changed from that at which the sounds were recorded, the pitch of the sounds being reproduced is also changed. Thus, there is the great possibility that one can hardly listen to and understand such reproduced sounds whose pitch is varied. As a consequence, it would be preferable that the above-described pitch conversion is performed to obtain such sounds having easy listening musical intervals, even during high-speed reproduction or low-speed reproduction. For instance, in the case of a tape on which a conference or business meeting has been recorded, when this tape is reproduced or played back at high speed the musical intervals of the conversational voices becomes much higher than normal, so that the contents of the recorded voices cannot be easily grasped. To the contrary, when the pitch conversion of the voice output is performed in such a manner that the musical interval of this voice output is lowered, everyone can listen to the reproduced voice with easy listening musical intervals, for example, with the musical interval at the rated tape drive speed.

At this time, the pitch converting amount is not manually controlled by the user, but a preselected pitch converting amount is automatically set in response to changes in the amount of the tape drive speed. Even when the user changes the tape drive speed, useful appliances could be realized if such sounds having the musical intervals obtained during rated tape drive speed are reproduced as the output.

In order that a predetermined pitch converting amount is automatically set in response to the amount of change of the tape drive speed, all previously proposed systems require a mechanism capable of detecting the tape drive speed. For example, a rotation frequency detecting mechanism such as a frequency generator (FG) is mounted to the motor that provides the tape drive, and a pitch control signal for setting the pitch converting amount in response to an output of this rotation frequency detecting mechanism is produced. To detect the position of the slider of a variable resistor used in a motor servo circuit to control the tape drive speed, a detecting variable resistor is provided which is mechanically coupled to the speed control variable resistor, and then a pitch control signal is produced based on the resistance value of this detecting variable resistor.

Since such a detecting mechanism is required when a predetermined pitch converting amount is automatically set in response to the change amount of the tape drive speed, there are disadvantages in view of manufacturing cost and package spacing.

OBJECTS AND SUMMARY OF THE INVENTION

The present invention has been made in consideration of the above-described problems and, therefore, has an object to solve great inconvenience as to manufacturing cost and packaging space, when it is so constituted that a tape drive speed based on a motor rotation frequency is detected and a predetermined pitch converting amount is automatically set in response to the amount of change of the tape drive speed.

To this end, in accordance with an aspect of the present invention a sound reproducing apparatus is provided having pitch converting means capable of varying a playback drive speed of a recording medium from a rated drive speed and also capable of converting a pitch of a sound signal reproduced from the recording medium, the pitch converting means is so arranged that when the drive speed of the recording medium is varied from the rated drive speed, a pitch converting operation is carried out in response to a pitch control signal used to set a preselected pitch converting amount in accordance with the speed changing amount. A reproduced sound signal having substantially the same pitch as that found during rated drive speed can be output and the pitch control signal is produced as a signal corresponding to the drive speed of the recording medium by employing a drive signal of the motor that drives the recording medium during playback.

Also, it is so arranged that the pitch control signal is produced as a signal corresponding to the drive speed of the recording medium by employing a rotation frequency control signal for controlling the rotation frequency, that is, the number of revolutions, of the motor providing the playback drive for the recording medium.

It is noted that the drive signal of the motor corresponds to a signal related to the drive speed of the recording medium. Similarly, the rotation frequency control signal used to control the rotation frequency, that is, the number of revolutions, of the motor corresponds to a signal related to the number of motor revolutions indicating the drive speed of recording medium.

As a consequence, a DC voltage proportionally corresponding to, for instance, the drive speed of the recording medium can be obtained from these signals. If this voltage is utilized, then a pitch control signal can be produced to perform a control such that a predetermined pitch converting amount is automatically set in correspondence with the amount of change of the drive speed, even when there is no FG mechanism for detecting the drive speed of the recording medium.

BRIEF DESCRIPTION OF THE DRAWINGS

FIG. 4 is an explanatory diagram for showing an output characteristic of an f/v converting unit of the first embodiment.

FIG. 11 is an explanatory diagram for explaining a pitch converting process in the tape recorder of the first embodiment.

FIG. 12 is an explanatory diagram for explaining a pitch converting process in the tape recorder of the first embodiment.

FIG. 18 is an explanatory diagram for explaining the servo system of the second embodiment.

FIG. 20(a)–20(c) are explanatory diagrams for explaining a characteristic between the manipulation amount and the changing rate for the number of revolutions in the second embodiment.

DETAILED DESCRIPTION OF PREFERRED EMBODIMENTS

A first embodiment of the present invention provides a pitch control signal produced by using the drive signal of the motor that sets the playback drive speed of the recording medium, whereas a second embodiment of the present invention provides a pitch control signal generated by using the rotation frequency control signal used for controlling the rotation frequency of the motor that sets the playback drive speed of the recording medium.

First, a cassette tape recording/reproducing apparatus, that is, a so-called tape recorder, incorporating the first embodiment will now be explained with reference to FIGS. 1 through 12.

Figure 2:
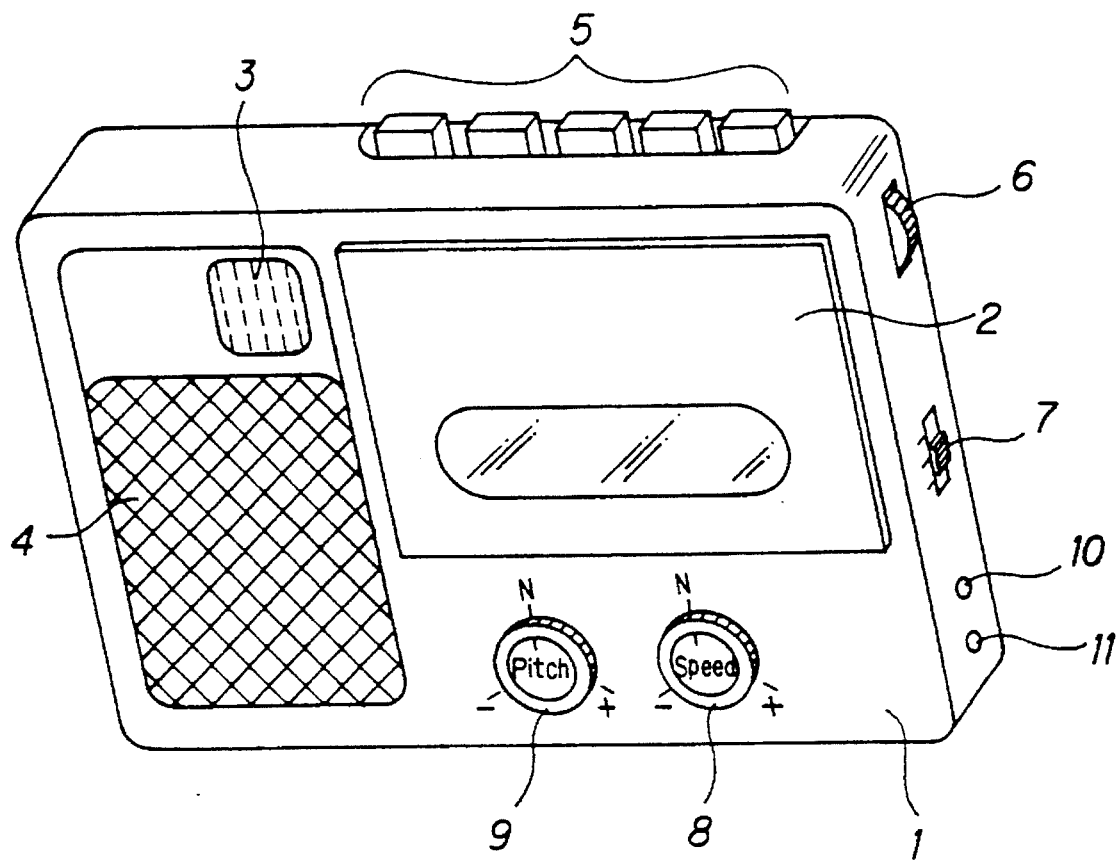
FIG. 2 is a perspective view showing a tape recorder of the first embodiment.

FIG. 2 is an overall perspective view of a tape recorder 1 in which reference numeral 2 denotes a cassette tape loading unit, reference numeral 3 shows a flat microphone, reference numeral 4 is a speaker, and reference numeral 5 indicates operation keys for performing various tape operations, such as playback, record, stop, fast forward, and rewind. Reference numeral 6 shows a volume control knob for controlling the volume of the sounds reproduced from the speaker 4.

In this tape recorder 1 reference numeral 7 indicates a pitch converting mode key, reference numeral 8 shows a speed control knob corresponding to a manipulation of a variable resistor (not shown in FIG. 2) for varying the tape speed, and reference numeral 9 is a pitch control knob corresponding to a manipulation of a variable resistor (not shown in FIG. 2) for manually controlling the pitch converting amount of the reproduced sound.

Reference numeral 10 shows an external microphone connection jack and reference numeral 11 indicates a headphone output jack.

In this tape recorder 1 a user turns the speed control knob 8 in a plus (+) direction during playback so that the sound recorded on the tape can be reproduced with an increased tape drive speed, whereas the user turns this speed control knob 8 in a minus (−) direction with a decreased tape drive speed.

As to the pitch converting mode key 7, three setting positions are defined by sliding this mode key. More specifically, the off-condition, manual condition, and auto-condition are set as the mode operations by mode key 7.

Under the manual mode condition, the user turns the pitch control knob 9 in a plus (+) direction, thereby increasing the pitch of the reproduced sound, or in a minus (−) direction thereby decreasing the pitch of the reproduced sound.

Furthermore, under the auto-condition, the reproduced sound is outputted at the pitch present when the tape is driven at the rated speed, regardless of the tape speed at this time. That is, normally when the speed control knob 8 is turned to increase/decrease the tape drive speed during playback, the frequency of the reproduced signal would be increased/decreased in accordance with the speed controls, however, in the case of this auto-mode, the pitch conversion is carried out on the original frequency by changing the frequencies of the reproduced signal in response to changes in the tape drive speeds, so that the reproduced sound is output as if under normal tape speed conditions. For example, when the tape speed control is increased in such a manner that the pitch of the reproduced sound is increased by five sounds, a pitch converting process is carried out so as to lower the pitch of the playback signal by five sounds.

It should be noted that the pitch control knob 9 does not work under this auto-condition mode.

When the pitch converting mode key 7 is brought into the off condition, no pitch converting processes for the manual/auto conditions described above will be carried out.

Figure 1:
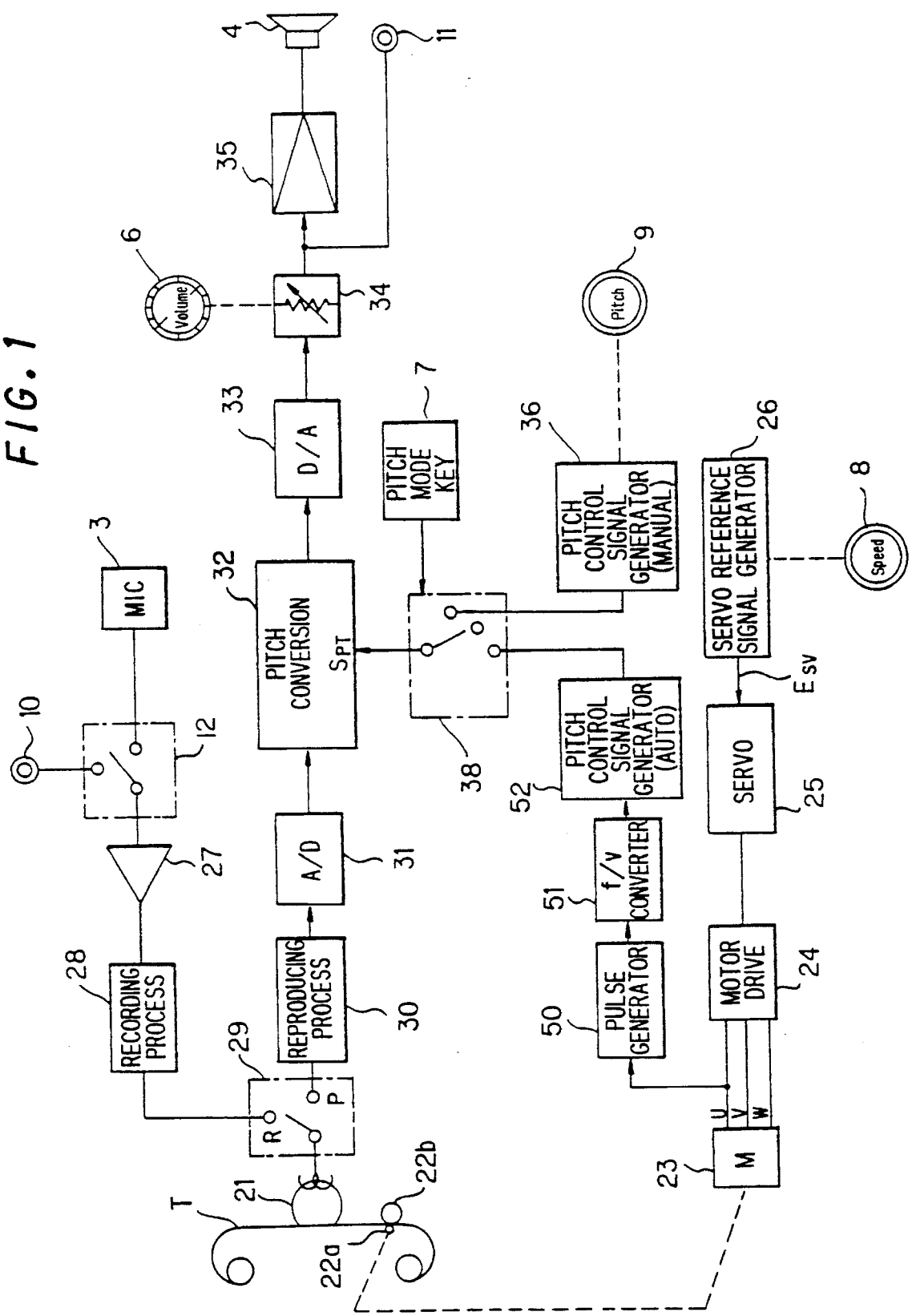
FIG. 1 is a block diagram of a first embodiment of the present invention.

FIG. 1 is a block diagram of the major internal elements of the tape recorder 1. Symbol "T" indicates a magnetic tape wound on a pair of reels and stored in a tape cassette (not shown). In the tape recorder 1 of this embodiment, when the cassette tape is loaded in the cassette tape loading unit 2 and either the recording or reproducing operation is performed, the magnetic head 21 abuts the magnetic tape T to record/reproduce the audio signals.

Reference numeral 22a indicates a capstan and reference numeral 22b a pinch roller, and both the capstan 22a and the pinch roller 22b rotate with the magnetic tape T sandwiched therebetween, so that the magnetic tape T is driven at a predetermined speed in response to the rotation speed of the capstan 22a.

The rotation of the capstan 22a is performed by a motor 23, such as a 3-phase brushless motor. Under control of a servo circuit 25, 3-phase drive signals (U,V,W) from a motor drive unit 24 are supplied to the motor 23, so that the motor 23 is rotated at a preselected rotation speed. The servo circuit 25 controls the output of the motor drive unit 24 in response to a servo reference signal Esv.

The servo reference signal Esv is produced by a servo reference signal producing unit 26 in accordance with the operation of the speed control knob 8. In other words, when the speed control knob 8 is set to an intermediate position, such as the position indicated by "N" in FIG. 2, the variable resistor (not shown) whose resistance value is varied by the speed control knob 8 has an intermediate resistance value within its resistance range, so that a servo reference signal Esv is obtained by which the rotation frequency of the motor 23 provides a tape drive speed that is the rated drive speed. When the speed control knob 8 is turned in the plus direction, a servo reference signal Esv is produced so that the rotation frequency of the motor 23 is increased in response to this turning angle and the tape drive speed increases. Conversely, when the speed control knob 8 is turned in the minus direction, a servo reference signal. Esv is outputted by which the rotation frequency of the motor 23 is slowed in response to this turning angle and the tape speed decreases.

A further description about this servo reference signal Esv will be provided in connection with the description of the second embodiment. This servo reference signal Esv corresponds to an output signal from a resistance-capacitance (RC) time-constant circuit in which the output signal is obtained by changing the charging voltage of the capacitor in accordance with the resistance value of the variable resistor in response to the manipulation of the speed control knob 8. In response to the frequency of this output represented by the servo reference signal Esv, the servo circuit 25 performs the servo operation.

In the audio signal recording system, either the sound signal input from the microphone 3 or the sound signal derived from an external microphone connected to the external microphone jack 10 is selected by a switch 12, and the input signal is amplified by an amplifier 27, so that an amplified sound signal is supplied to a recording processing unit 28. Then, an audio signal to which the record equalizing process and the level controlling process have been performed in the recording process unit 28, is supplied via an Roterminal of the switch 29 to the magnetic head 21 and is recorded onto the magnetic tape T being driven at the rated speed.

During playback the signal read from the magnetic tape T by the magnetic head 21 is supplied via a P-terminal of the switch 29 to a reproducing processing unit 30 in which playback equalization processing and the like are carried out.

An audio signal output from the reproducing processing unit 30 is converted into a digital audio signal by an A/D converter 31, and the digital audio signal is fed to a pitch converting unit 32 constructed, for instance, as a digital signal processor (DSP).

The pitch converting unit 32 performs the process for increasing/decreasing the pitch with respect to the entered digital audio signal in response to a pitch conversion control signal SPT, thereby outputting the pitch-converted audio signal.

The output signal of the pitch converting unit 32 is returned to an analog signal by a D/A converter 33. Then, after level control has been executed by a sound volume control 34 that is variable by the volume control knob 6, this analog signal is amplified to a predetermined level by an output amplifier 35 and is output as sounds or voice from the loudspeaker 4. Otherwise, this analog signal is supplied to a headphone output jack 11 to be output as sounds or voice over a headphone connected to this headphone output jack 11.

In the pitch converting unit 32, the input digital audio signal from the A/D converter 31 is written into a RAM and is read out therefrom in a different manner from the writing manner, so as to realize the pitch or frequency conversion. This pitch converting operation will now be explained.

Assuming that the sampling frequency of the A/D converter 31 is 16 Khz, the data for every 1/16,000 seconds (62.5 microseconds) are sequentially written into the RAM (not shown in FIG. 1) of the pitch converting unit 32. When the data are read out from the RAM in the order of the data writing operation for every 1/16,000 seconds and sequentially output, the same waveform as that of the input signal to the A/D converter 31 can be reproduced at the output signal from the D/A converter 33. Thus, no pitch conversion is carried out.

On the other hand, when pitch conversion is to be carried out, the data reading method for the RAM is changed as follows. First, in FIG. 9, there is shown a case in which the frequency of the audio is multiplied by ½, in other words, the sound pitch is lowered by one octave. Assuming now that the waveform of the input signal from the A/D converter 31 is a waveform such as shown at the lower portion of FIG. 9, the data that are sampled by the A/D converter 31 and then fed to the pitch converting unit 32 are D1, D2, ... Dn. Also, it is assumed that these data D1, D2, ... Dn written into the RAM of the pitch converting unit 32 correspond to sound or audio data for 30 milliseconds.

Figure 9:
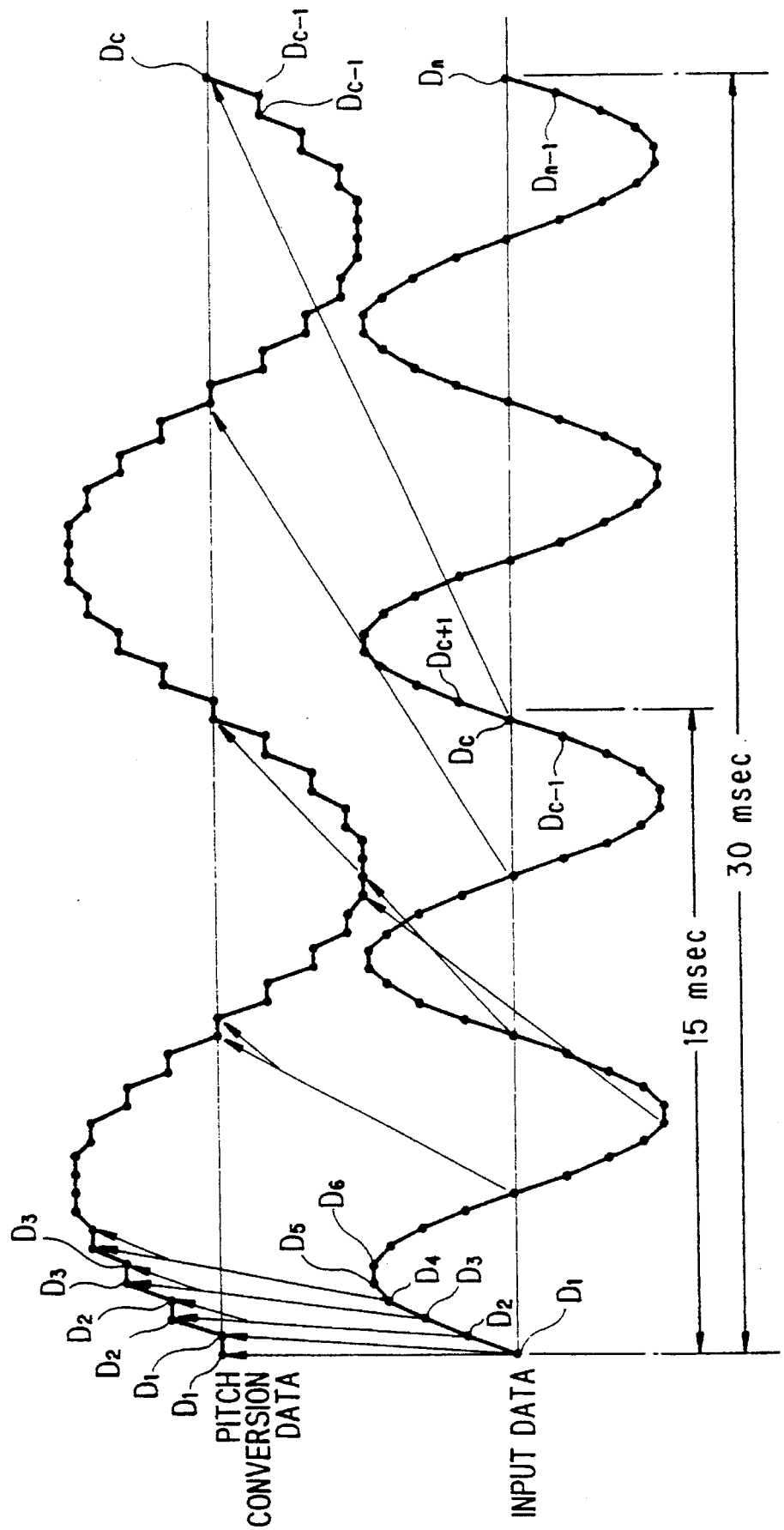
FIG. 9 is an explanatory diagram for explaining a pitch converting process in the tape recorder of the first embodiment.

Here, when reading from the RAM, if the data are sequentially read twice for the first data D1, then a waveform as shown in the upper portion of FIG. 9 is produced from the data, D1 to Dc, for an initial half period of 15 ms. That is, since such read data are supplied to the D/A converter 33, an audio signal waveform whose frequency is one half is produced, so that it implies that the pitch conversion to lower the sound by one octave is carried out. It should be understood that the data (Dc+1 to Dn) for a subsequent half period of 15 ms are unnecessary in this case.

Figure 10:
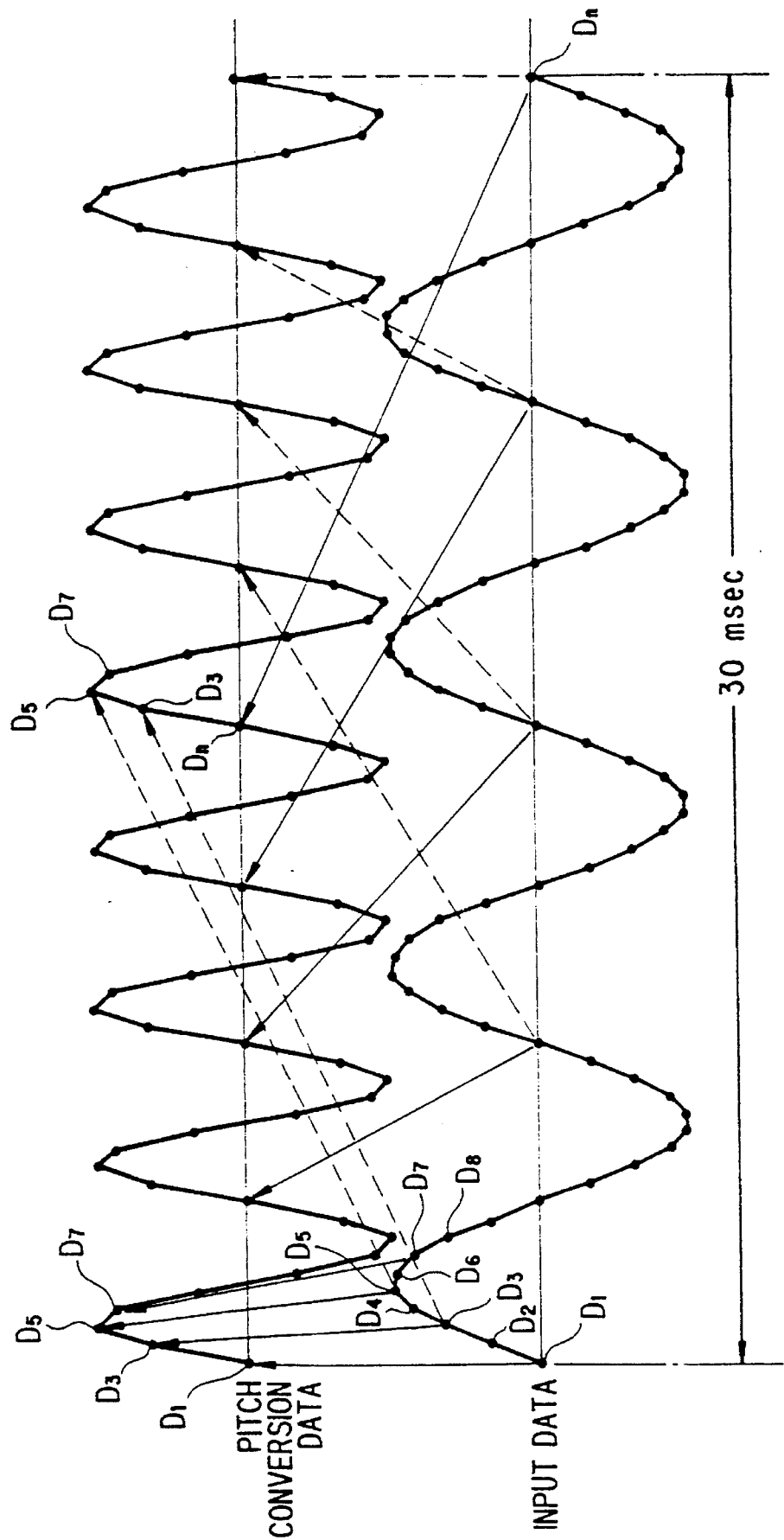
FIG. 10 is an explanatory diagram for explaining a pitch converting process in the tape recorder of the first embodiment.

Next, FIG. 10 represents the case in which the frequency is multiplied by two, so that the sound pitch is increased by one octave. Assuming now that the input signal waveform of the A/D converter 31 is a waveform which is the same as shown in the lower portion of FIG. 9, then the data that are entered into the pitch converting unit 32 and stored in the RAM are D1, D2, ..., Dn.

In this case, every second data are read from the head data of the entire data stored in the RAM. That is, the data are sequentially read from the RAM in the order of D1, D3, D5, D7 ..., Dn, whereby a waveform shown in the upper portion of FIG. 10 is produced as indicated by solid-line arrows from the lower portion waveform to the upper portion waveform in. It should be understood that since the data stored in the RAM for a 30 ms period are read as every second data D1, D3, ..., the resultant waveform for only a 15 ms period is produced. Accordingly, after the last data Dn has been read, the data from D3, D5, D7, ..., Dn are again read in the same order indicated by the dotted-line arrows from the lower portion waveform to the upper portion waveform in FIG. 10. As a consequence, as shown in the upper portion of FIG. 10, a waveform having twice the pitch as the original signal is produced for a 30 ms period.

Furthermore, when the pitch is converted into an intermediate condition between one-half pitch and two-times pitch, the RAM reading method is varied in accordance with this intermediate pitch converting amount. For instance, there is shown in FIG. 11 the case in which the sound is pitch-converted by −30%, which is approximately −3.5 tones.

In this case, as to the data D1 to Dn held in the RAM, one piece of data is doubled and read out twice from this RAM for every three pieces of data. That is, the data are read in the sequence of D1, D2, D3, D3, D4, D5, D6, D6, .... Then, when the data DE has been read out, pitch-converted data corresponding to the 30 ms time length of the input data is produced, as illustrated in an upper portion waveform in FIG. 11. This pitch-converted data is D/A-converted to produce an audio signal whose pitch has been converted downwardly by approximately −3.5 tones.

Similarly, in case of other pitch converting amounts, the RAM reading method is set in response to their pitch converting amounts for performing the proper pitch conversion.

Referring back to FIG. 1, the pitch conversion control signal SPT for controlling the pitch converting amount in the pitch converting unit 32 is produced by pitch control signal generating units 36 and 52, and the output from one of these units is selected by a switch 38 and is supplied to the pitch converting unit 32.

The switch 38 is switched by the pitch mode control key 7 operated by the user. When the slide position of the pitch mode key 7 is set to the manual mode position, the MN input terminal of this switch 38 is connected to the output. When the slide position of the pitch mode key 7 is set to the auto (AT) mode position, the AT input terminal is connected to the output. When the slide position of pitch mode control key 7 is set to the off mode position, the blank OF terminal is connected to the output.

When the switch 38 is connected to the OF terminal, no pitch conversion control signal SPT is supplied to the pitch converting unit 32 and, therefore, no pitch conversion is carried out.

When the switch 38 is connected to the MN terminal, the pitch conversion control signal SPT having a preselected potential in accordance with the resistance value of the variable resistor functioning in accordance the manipulation of the pitch control knob 9 is produced from the pitch control signal generating unit 36, and then is supplied to the pitch converting unit 32, so that the pitch converting process is performed in correspondence with the manipulation of the pitch control knob 9 by the user.

When the switch 38 is connected to the AT terminal, the pitch converting process is carried out in the manner that the reproduced sound is output with a pitch corresponding to when the tape is driven at the rated speed regardless of the present tape speed. As a result, the pitch conversion control signal SPT having a predetermined potential is output from the pitch control signal generating unit 52 based on the present tape drive speed information, and then is supplied to the pitch converting unit 32. As a consequence, even when the tape speed is selected to be faster than the rated speed, or slower than the rated speed, easy-listening sounds having a normal tone and pitch can be reproduced.

The relation among the pitch-converting amount, the frequency $f_0$ at the rated drive speed at the rated drive speed, and the frequency $f_n$ after pitch conversion is shown by the following expression:

$$f_n = 2^{n/12} \times f_0 \qquad (1)$$

where n=the pitch converting amount×2.

The relationship in FIGS. 12 are derived from this expression.

Figure 13:
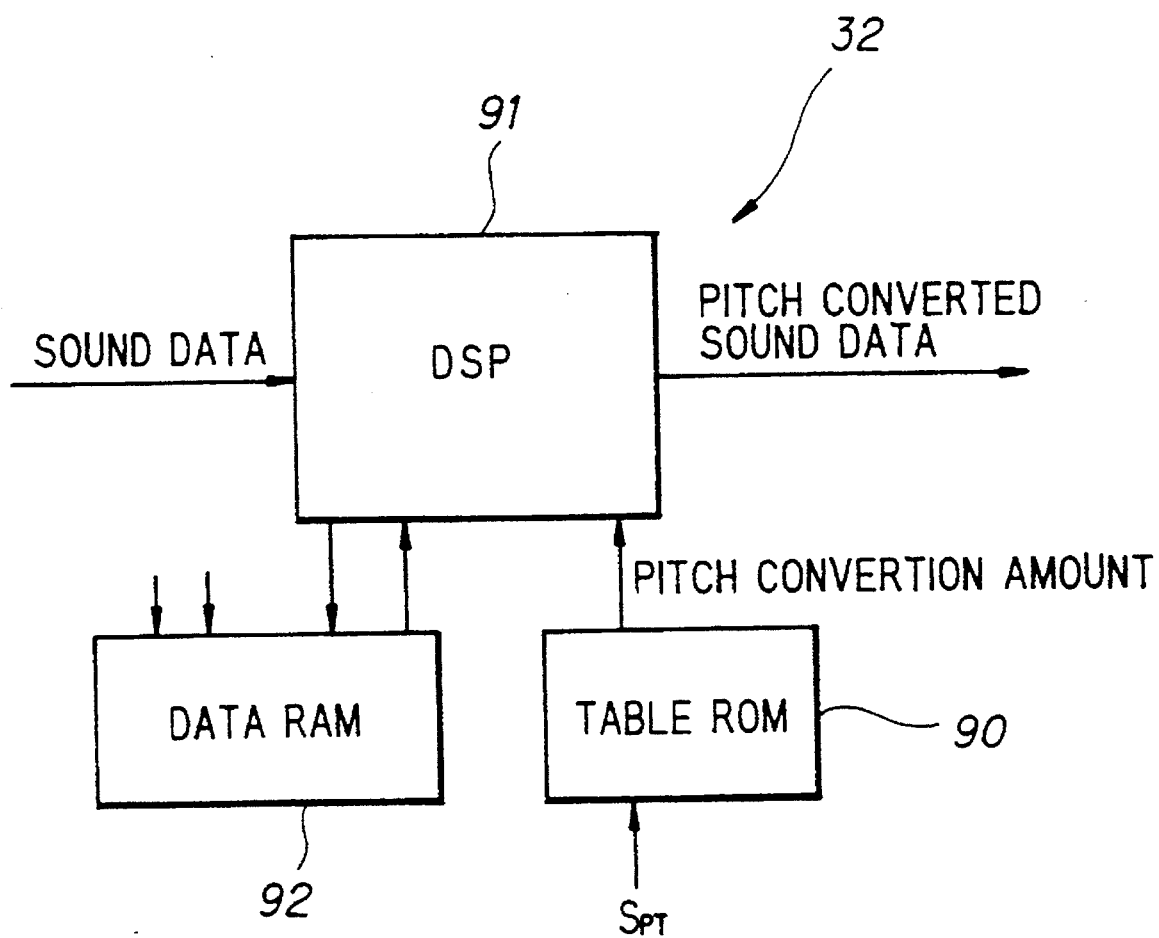
FIG. 13 is a block diagram showing the pitch converting unit of FIG. 1 in more detail.

FIG. 12 shows a conversion table that is contained in the pitch converting unit 32, for example, which is shown in more detail in FIG. 13. Column (a) in FIG. 12 represents pitch conversion amounts related to the pitch conversion control signal SPT when the operation voltage VDD is set to 3.5 V. In this example, 32-staged voltages are set with respect to this operation voltage VDD when set at 3.5 V, and the pitch control signal generating unit 52 supplies them to the pitch converting unit 32 as the pitch conversion control signal SPT. For example, as seen from column (b)v, in case of the pitch conversion control signal SPT=2.19 V to 2.08 V, no pitch conversion is carried out. In case of the pitch conversion control signal SPT when VDD=3.5 V, the pitch conversion is performed in order that the sound is increased by 6 tones (1 octave). In case of the pitch conversion control signal SPT when VDD=0.88 to 0.77 V, the pitch conversion is performed in order that the sound is decreased by 6 tones (1 octave).

Moreover, in case of the auto mode, as shown in column (e) of FIG. 12, the pitch conversion is performed in response to the change in the number of motor revolutions, that is, the tape drive speed. The pitch conversion amount of the reproduced audio signal caused by this change in the number of motor revolution (tape drive speed), corresponds to column (b) in FIG. 12.

Column (c) in FIG. 12 indicates the frequency changing rate with respect to the sound data when the pitch conversion amount is zero and to the various sound data for the other respective pitch conversion amounts. That is, the pitch change in the reproduced audio signal caused by the change in the tape drive speed is returned to the pitch of the reproduced audio signal during the rated drive speed, and the pitch converting process corresponding to the frequency changing rate shown in column (d) of FIG. 12 is performed.

In other words, when the auto mode is selected, the pitch control signal generating unit 52 may produce the pitch conversion control signal SPT which becomes the voltage value of column (a) in accordance with the number of motor revolutions shown in column (e). Accordingly, this tape recorder of FIG. 1 can produce a sound output having the normal pitch regardless of the tape drive speed.

It should be noted in this case that the pitch control signal generating unit 52 requires a signal that linearly responds to the tape speed change, or the voltage proportionally varied in response to the tape speed change, as the tape drive speed information.

To this end, both a pulse generating unit 50 and a frequency-to-voltage converting unit 51 are employed in this embodiment.

Figure 3A:
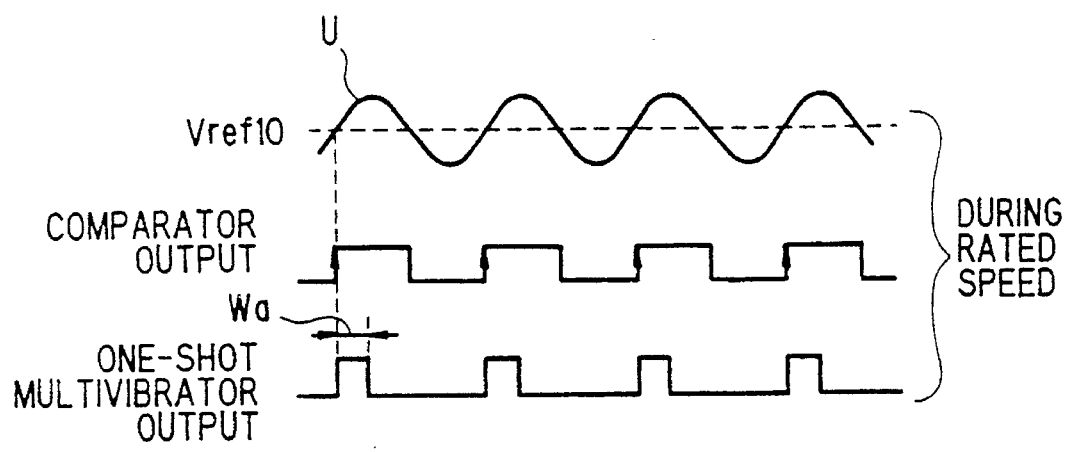
FIGS. 3A–3C are explanatory diagrams for explaining operation of a pulse generating unit according to the first embodiment.
Figure 3B:
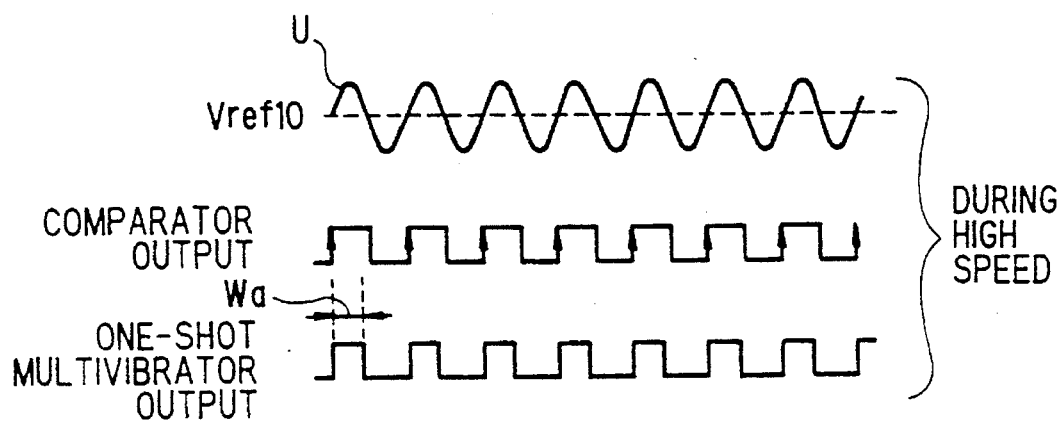
Figure 3C:
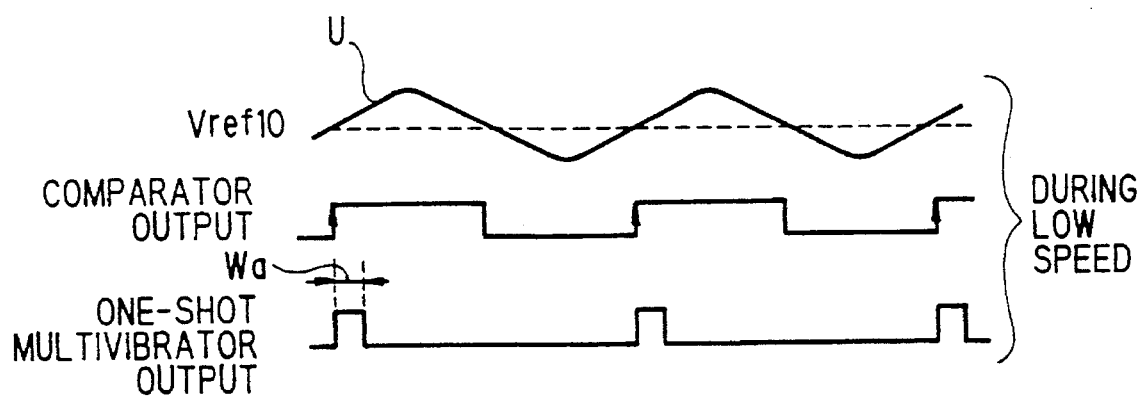

The pulse generating unit 50 receives, for example, the U-phase signal waveform among the 3-phase (U,V,W) drive signals output from the motor drive unit 24 and generates a pulse in correspondence with the frequency of this U-phase waveform. In FIGS. 3(a), 3(b), 3(c), there are shown various operations of the pulse generating unit 50 during the tape drives at rated speed, high speed, and low speed, respectively.

The pulse generating unit 50 includes a comparator (not shown) for comparing the U-phase drive signal with the reference voltage Vref10, and further includes a one-shot multivibrator (not shown) for outputting a pulse having a fixed pulse width (Wa) by using a rising edge of an output pulse from the comparator as a trigger. As apparent from FIGS. 3(a) to FIG. 3(c), frequency pulses in correspondence with the U-phase drive signal can be obtained as the output of the one-shot multivibrator. The output from this one-shot multivibrator corresponds to the pulse having a frequency determined in accordance with the tape drive speed.

This output from the pulse generating unit 50 is converted in the f/v converting unit 51 into a voltage value proportional to the frequency using a converting characteristic such as shown in FIG. 4, and then the converted voltage signal is applied to the pitch control signal generating unit 52. In other words, a voltage value is applied to the pitch control signal generating unit 52 that is varied in proportion to the tape speed variation. Since this voltage signal is to control the above-described pitch converting process in the auto mode, a pitch conversion control signal SPT based on the values shown in FIG. 12 may be output.

A pitch converting unit 32 is shown in more detail in FIG. 13 and has the table of FIG. 12 that represents the relation between $S_{PT}$ and the pitch converting amount stored in a read only memory (ROM) 90. The ROM 90 receives the $S_{PT}$ signal and read-out amount from the ROM 90 is fed to a digital signal processor 91 that has associated with it a data memory (RAM) 92. The data memory 92 functions with the digital signal processor 91 in the conventional fashion. The input sound data from the A/D converter 31 is fed as the input signal to the digital signal processor 91 that produces the pitch converted sound data fed to the D/A converter 33 in response to the pitch conversion amount from the table ROM 90.

Figure 5:
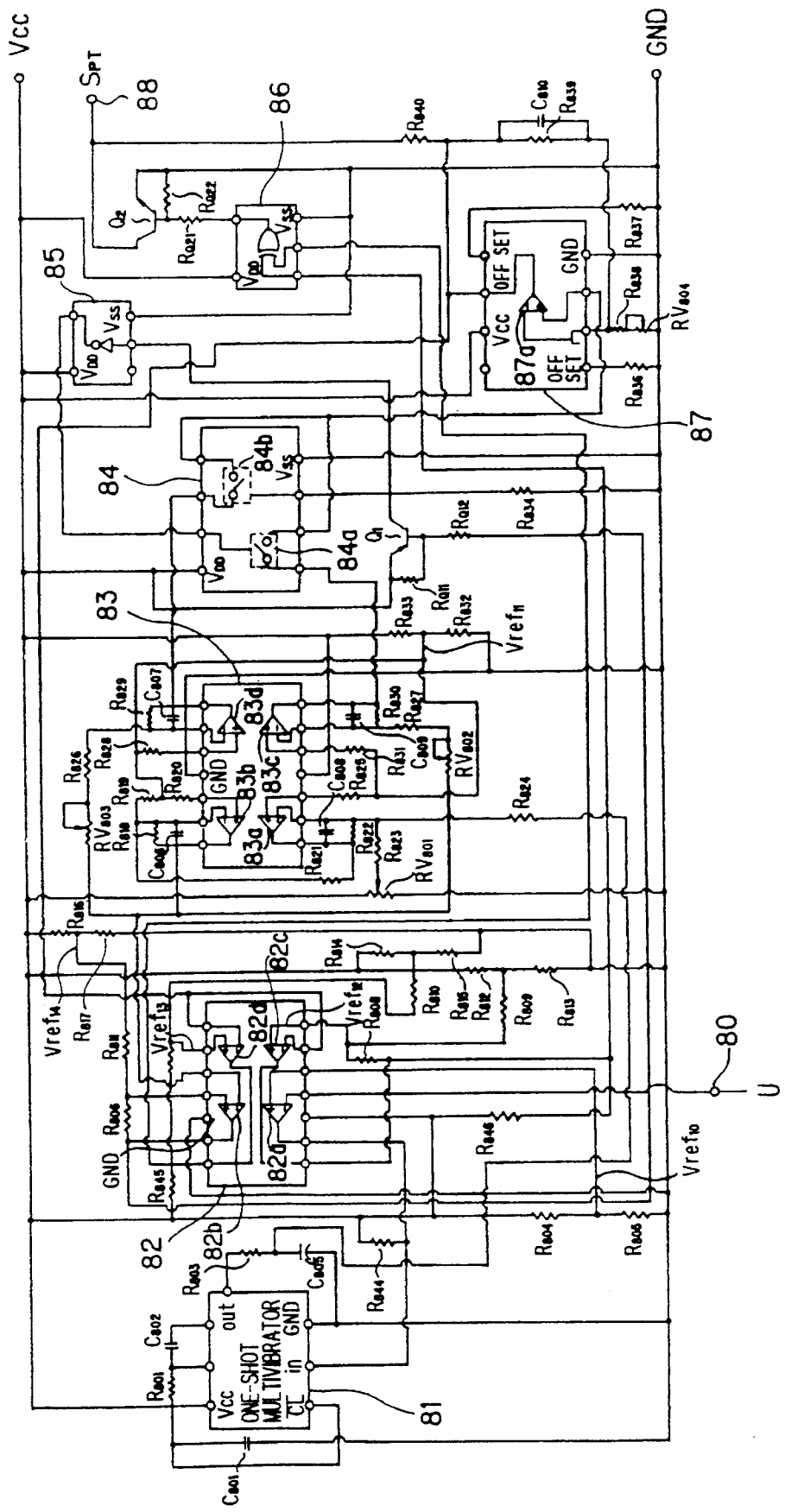
FIG. 5 is a circuit diagram of the pulse generating unit of the first embodiment.

An example of the actual circuits corresponding to the pulse generating unit 50, the f/v converting unit 51, and the pitch control signal generating unit 52 is shown in FIG. 5.

In FIG. 5, reference numeral 80 indicates a terminal at which the U-phase drive signal corresponding to the output from the motor drive unit 24 is applied. Reference numerals 81 to 87 show circuit units constructed of an IC chip in which reference numeral 81 is a one-shot multivibrator, reference numeral 82 shows a comparator unit, and reference numeral 83 indicates an operational amplifier unit. Reference numeral 84 is an analog switch unit, reference numeral 85 shows an inverter, reference numeral 86 indicates an EX-OR circuit, and reference numeral 87 indicates an operational amplifier unit. Reference numeral 88 denotes a terminal from which the pitch conversion control signal SPT is output, and this signal corresponds to the output from the pitch control signal generating unit 52 of FIG. 1.

The U-phase drive signal fed in at terminal 80 is supplied to a (−) input terminal of a comparator 82a employed in the comparator unit 82. A reference voltage Vref10 produced by sub-dividing the power source voltage Vcc by resistors R804 and R805 is applied to a (+) input terminal of this comparator 82a.

As a consequence, as illustrated in FIGS. 3(a) to 3(c), the U-phase drive signal is compared with the reference voltage Vref10 in the comparator 82a, so that a pulse corresponding to the frequency of the U-phase drive signal is output.

An output from the comparator 82a is supplied as a trigger to the one-shot multivibrator 81. In the one-shot multivibrator 81, the rising portion of the output pulse from the comparator 82a is employed as the trigger, and a pulse having a pulse width "Wa" set by a resistor R801 and a capacitor C802 is output as shown in FIGS. 3(a) to 3(c). The output of the one-shot multivibrator 81 is supplied to a series circuit made up of a resistor R803 and a capacitor C805, which comprise the f/v converting unit 51, and is rectified. Here, a voltage appearing across the capacitor C805 becomes a DC voltage depending on the frequency of the output pulse from the one-shot multivibrator 81. That is, since the DC voltage appearing across the capacitor C805 is determined by the pulse width and the charged electron amount defined by a time period of this pulse, when the pulse period becomes short a high DC voltage is obtained, whereas when the pulse period becomes long a low DC voltage is obtained. Then, as the time period of the pulse output from the one-shot multivibrator 81 is determined by the waveform of the drive signal derived from the terminal 80, the voltage across the capacitor C805 becomes higher when the tape drive speed becomes fast. Conversely, the voltage across the capacitor C805 becomes lower when the tape drive speed becomes slow. Thus, the f/v conversion output having the characteristic as shown in FIG. 4, namely the DC voltage relative to the tape drive speed, can be obtained.

In the circuit of FIG. 5, the pitch control signal generating unit 52 produces the pitch conversion control signal SPT in response to the voltage across the capacitor C805.

Then the pitch shift operation based on the pitch conversion controlling signal SPT in the pitch converting unit 32 is carried out as shown, in accordance with the values in the table of FIG. 12.

Figure 6:
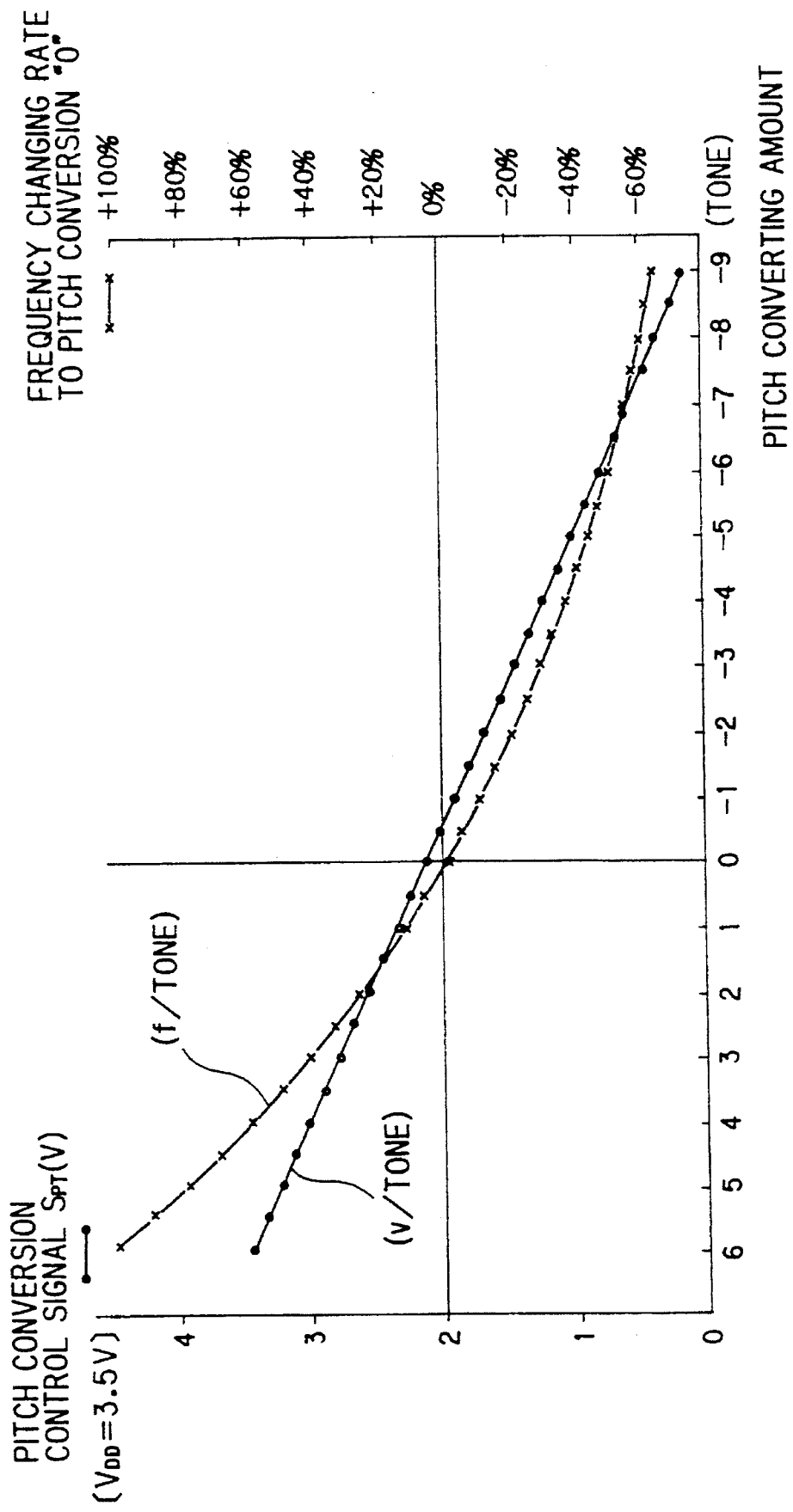
FIG. 6 is an explanatory diagram for explaining an operation characteristic of a pitch converting unit of the first embodiment.

Both of the relationship (V/sound) between the pitch conversion control signal SPT and the pitch converting amount of columns (a) and (b) of FIG. 12, and the relationship (f/sound) between the pitch converting amount and the frequency changing rate for the pitch zero conversion of columns (b) and (c) of FIG. 12, are graphically indicated in FIG. 6.

Figure 7:
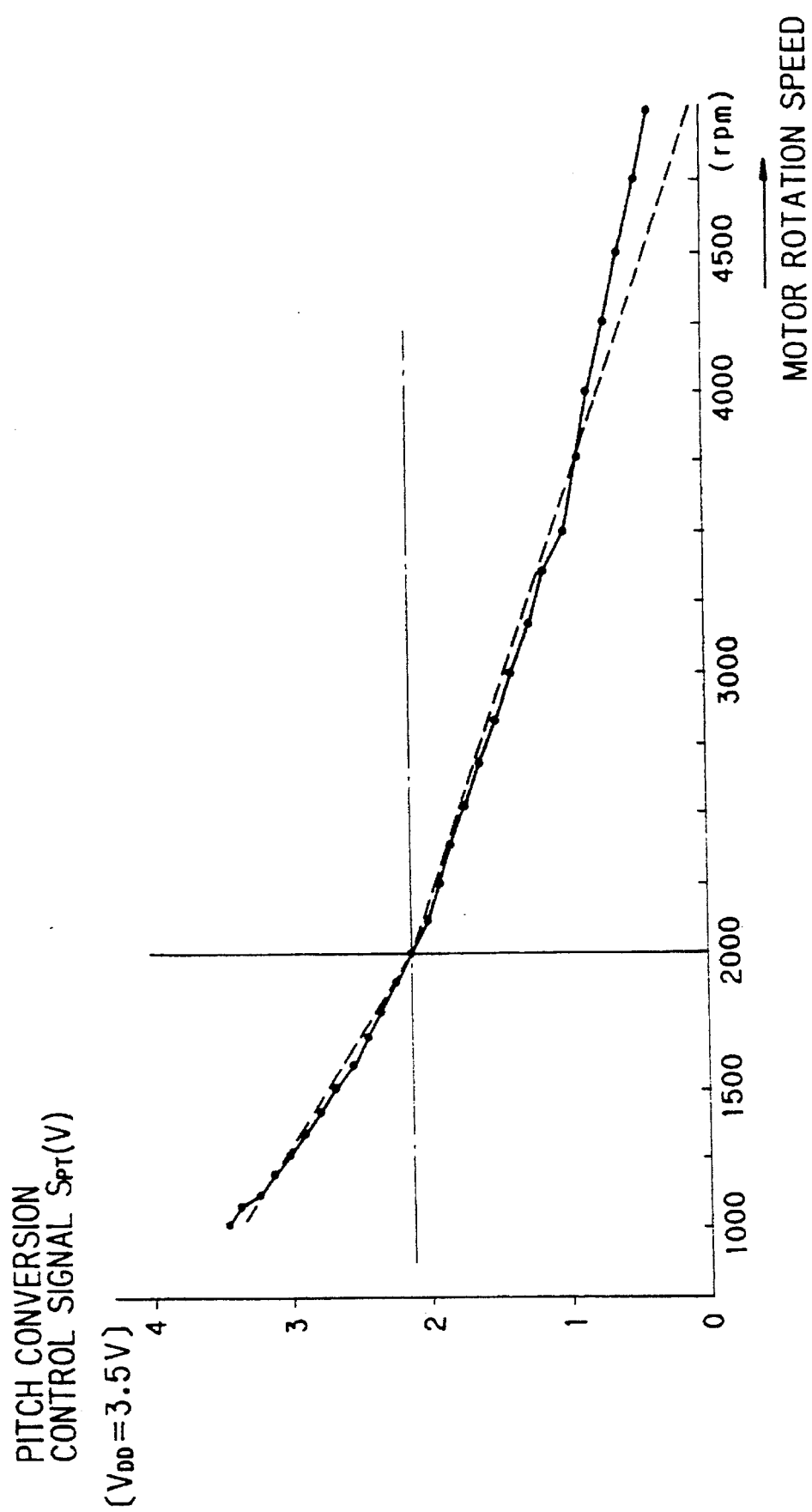
FIG. 7 is an explanatory diagram for explaining an operation characteristic of a pitch converting unit of the first embodiment.

On the other hand, the relationship between the pitch conversion control signal SPT and the number of motor revolutions is graphically indicated by the solid line in FIG. 7.

As apparent from FIG. 6, the pitch converting amount is constantly changed with respect to the voltage changes of the pitch conversion control signal SPT. In this case, considering now that a proper amount of pitch conversion is performed in accordance with the change in the tape drive speed, and the converted pitch is returned to substantially the same pitch achieved during the rated drive speed as the above-described auto-mode operation, it would be preferable that the number of motor revolutions utilized to detect the tape speed, and also the voltage value of the pitch conversion control signal SPT, are uniformly varied with regard to the shift in the rotation frequency from the normal rotation frequency (200 rpm) during the rated speed. Nevertheless, the relationship between the change in the pitch conversion control signal SPT and the change in the number of motor revolutions is not uniform, as is apparent from FIG. 7.

However, when observing the number of motor revolutions for the high-speed side and the low-speed side on the basis of the normal revolution number (2000 rpm) at the rated speed, it may be seen as indicated by the broken line of FIG. 7 that it is approximated by two straight lines.

In other words, the pitch control signal generating unit 52 may generate the pitch conversion control signal SPT, as indicated by the broken line of FIG. 7, such that the pitch conversion control signal has the characteristics of two approximated straight lines whose inclinations are different from each other on the basis of that of the rated speed, from the output (see FIG. 4) derived from the f/V converting unit 51, which corresponds to the voltage value uniformly changed in response to the number of motor revolutions.

It should be noted that since these are approximated straight lines, the frequency of the pitch-converted signal is not exactly coincident with the frequency of the signal produced during the rated speed drive. Nevertheless, there is no practical problem that these frequencies can not be approximated within the range of shifts of +0.5 tone to −0.5 tone.

A circuit arrangement and operations of the pitch control signal generating unit 52 to achieve the above-described approximation will now be explained with reference to FIG. 5 and FIG. 8. As shown in FIG. 5, the output from the f/V converting unit 51, namely the voltage across the capacitor C805, is applied to the (−) input terminal of the operational amplifier 83a employed in the operational amplifier unit 83. A DC potential produced by subdividing the power source voltage Vcc by the variable resistor RV801 is also applied via a resistor to this (−) input terminal of the operational amplifier 83a. Another DC potential (Vref11) produced by subdividing the power source voltage Vcc by resistors R832 and R33 is applied to the (+) input terminal of the operational amplifier 83a.

More specifically, a potential offset by a voltage derived from the output potential of the f/V converting unit 51 by the variable resistor RV801 is inputted to the (−) input terminal of the operational amplifier 83a, and then a difference voltage between this potential and the reference potential Vref11 is invert-output from the operational amplifier 83a.

The output from the operational amplifier 83a is used as the (−) input of an operational amplifier 83b. From the operational amplifier 83b, the reference voltage Vref11 corresponding to the (+) input is invert-output as a reference with respect to the output of this operational amplifier 83b.

It should be noted that the variable resistor RV801 is controlled in the manner that the output of the operational amplifier 83a obtained under the rated rotation frequency is coincident with the reference potential Vref11, whereby the above-described offset is set.

Figure 8:
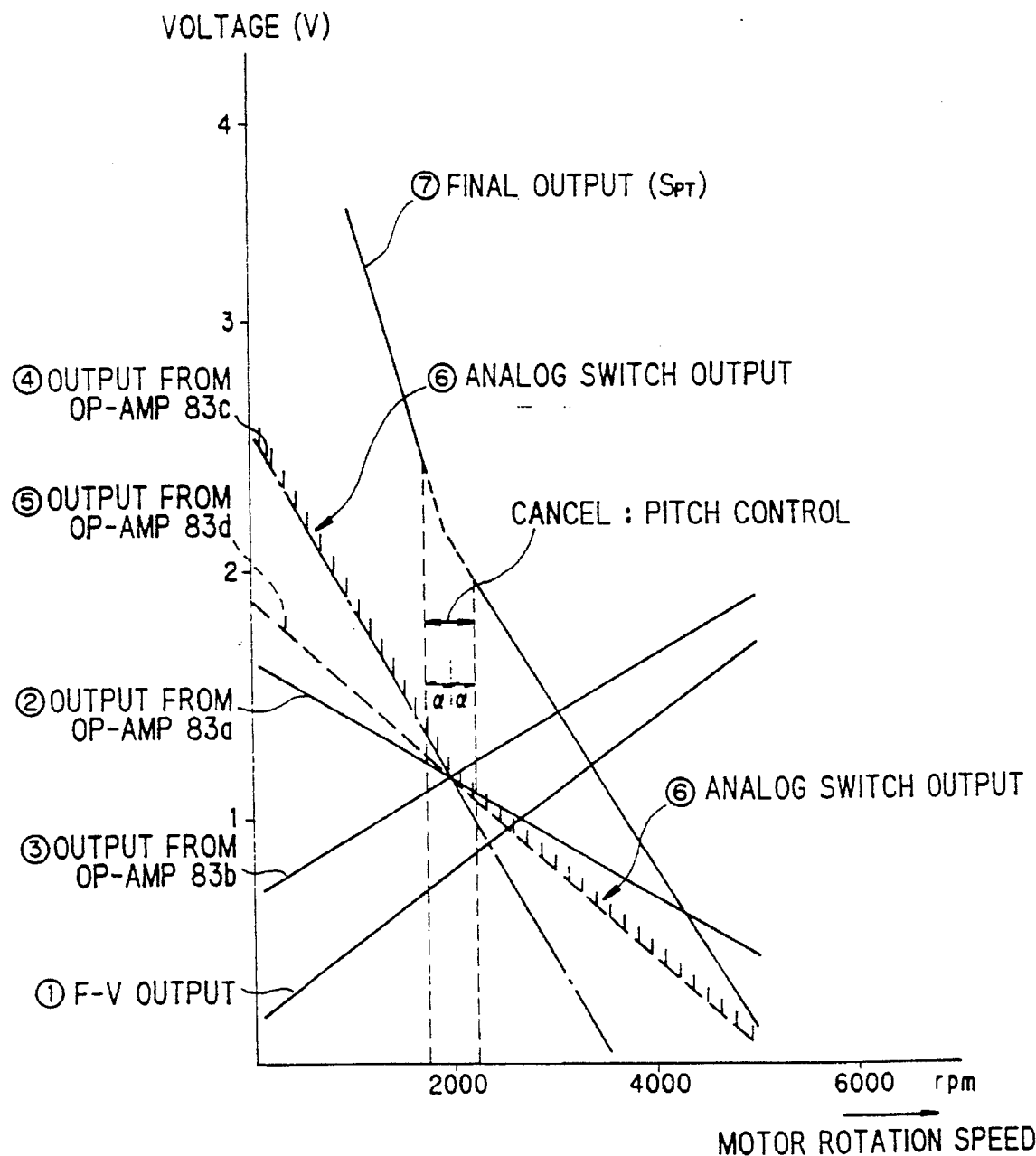
FIG. 8 is an explanatory diagram for explaining operations for producing a pitch control signal of the first embodiment.

The characteristics concerning the above-explained operations are indicated as curves ①, ②, and ③ in FIG. 8.

The output from the operational amplifier 83b is supplied to the respective (−) input terminals of operational amplifiers 83c and 83d. The operational amplifiers 83c and 83d are inverting amplifiers having respective (+) input terminals to which is applied the same reference voltage Vref11 as in the operational amplifier 83b. The gain of the operational amplifier 83c is controlled by way of the variable resistor RV802, whereas the gain of the operational amplifier 83d is controlled by way of the variable resistor RV803.

The reason why the output of the operational amplifier 83b is simultaneously inputted to both of the operational amplifiers 83c and 83d, and further why the gain controls of these operational amplifiers 83c and 83d are separately executed by the variable resistors RV802 and RV803, is the requirement to produce such pitch conversion control signals SPT having different characteristics during the high-speed drive and the low-speed drive on the basis of the reference characteristic during rated speed, as indicated by the broken line of FIG. 7 described above.

In other words, the respective characteristics of the output signals from the operational amplifiers 83c and 83d are represented by the dot/dash line ④ in FIG. 8 and the broken line ⑤ in FIG. 8. To this end, the gain controls are separately performed. Further, as indicated by a shaded portion ⑥, which is the output of analog switch unit 84, when the number of motor revolutions is at the low speed, the output 4 of the operational amplifier 83c is selected to be used as the output ⑥ of the analog switch unit 84. When the number of motor revolutions is at the high speed, the output ⑤ of the operational amplifier 83d is selected to be used as the output ⑥ of the analog switch unit 84. Accordingly, the signals having such different characteristics during the high speed and the low speed are obtained. Then, the pitch conversion control signal SPT shown at ⑦ is produced based on the output ⑥ of the analog switch unit 84.

First, to discriminate the characteristic during the high speed from the characteristic during the low speed on the basis of the characteristic during the rated speed, the output of the operational amplifier 83b is supplied to the (−) input terminal of the comparator 82b. To the (+) input terminal of this comparator 82b, a reference voltage Vref14 is applied that is produced by subdividing the power source voltage Vcc by resistors R816 and R817 and is identical to the reference voltage Vref11 in the operational amplifier unit 83.

Since the reference voltage Vref11 equal to the reference voltage Vref14 is coincident with the output potentials of the operational amplifiers 83a and 83b when the tape is driven at the rated speed, since variable resistor RV801 is controlled so as to make it coincident with Vref11, the output from the comparator 82b for comparing the output ③ of the operational amplifier 83b with the reference voltage Vref14 will be an "L" level signal when the tape is driven at the low speed, whereas an "H" level signal is output when the tape is driven at the high speed.

The output of this comparator 82b is converted by a transistor Q1 into "H", or "L" at the level of Vcc, which will be supplied to the analog switch unit 84 as a switching control signal for a switch 84b. The output of this transistor Q1 is inverted by an invertor 85 and the inverted signal is supplied as a switch control signal to the other switch 84a of the analog switch unit 84. As a consequence, any one of these switches 84a and 84b is turned ON in response to the output from the comparator 82b. The output of the operational amplifier 83c is supplied to the input terminal of the switch 84a, and the output of the operational amplifier 83d is supplied to the input terminal of the switch 84b. The outputs of the switches 84a and 84b are connected to each other and are supplied to the operational amplifier unit 87.

Accordingly, since the switch 84a and the switch 84b are controlled in response to the output from the comparator 82b, as described above, when the number of motor revolutions is slower than that of the rated speed, the output ④ of the operational amplifier 83c is selected to be used as the output 6 of the analog switch unit 84. When the number of motor rotations is faster than that of the rated speed, the output ⑤ of the operational amplifier 83d is selected to be used as the output ⑥ of the analog switch unit 84.

The output selected by this analog switch unit 84 is amplified by an operational amplifier 87a whose gain is set by the variable resistor RV804, whereby a final output having the characteristic shown at ⑦ in FIG. 8 is obtained. Specifically, the pitch conversion control signal SPT is obtained at the output terminal 88. Since this control signal is supplied to the pitch converting unit 32, the above-explained pitch converting operation in the auto mode is performed.

As previously described, the variable resistor RV801 must be controlled so that the output of the operational amplifier 83b during the tape drive operation at the rated speed is coincident with the reference voltage Vref11, which is coincident with Vref14. Nevertheless, in practice it is very difficult to adjust the resistance value of this variable resistor RV801 during the manufacturing stage in a manner such that the pitch converting amount becomes precisely zero in case of the number of motor revolution (2000 rpm) at the rated drive speed.

More specifically, when the tape is driven at the rated speed, the number of motor revolutions at the rated drive speed cannot be continuously maintained, and there is some risk that this number of motor revolutions will be increased and/or decreased to some extent.

Therefore, if the pitch control operation is canceled within a certain allowable range with regard to the rotation frequency at the rated drive speed, as shown in FIG. 8, then the allowable range for the adjusting value may be widened and the adjusting stage can become simplified.

Thus, to set the above-mentioned cancellation range, the comparators 82c, 82d, the EX-OR circuit 86, and the transistor Q2 are employed in the circuit of FIG. 5. Then, the output from the operational amplifier 87a functioning as the pitch conversion control signal SPT is also supplied to the (−) input terminals of the comparators 82c and 82d. The reference voltages Vref12 and Vref13 having different values from each other are supplied to the respective (+) input terminals of the comparators 82c and 82d. As these reference voltages Vref12 and Vref13, the following potentials are set by adding and subtracting the voltage (V) to and from the voltage value VPTO during the rated speed. That is, this voltage corresponds to the range of the rotation frequency which may constitute a cancel range+$\alpha$% and −$\alpha$% that is desired to be set for the voltage value (VPTO) of the pitch conversion control signal SPT during the rated speed. The outputs of the comparators 82c and 82d are fed to the inputs of the EX-OR circuit 86, respectively.

Assuming now that, for instance, the reference voltage Vref12 of the comparator 82c is VPTO+V $\alpha$ and the reference voltage Vref13 of the comparator 82 is VPTO−V $\alpha$, the logic outputs of the comparators 82c, 82d and the EX-OR circuit 86 are set out in correspondence with the tape drive speeds as:

| comp. 82c | H | H | H | H |
|---|---|---|---|---|
| comp. 82d | L | H | H | H |
| EX-OR 86 | L | H | H | L |

That is, as the output of the EX-OR circuit 86, an "H" output is obtained when it is present within the range of canceling width for the rotation frequency at the rated speed+$\alpha$% and −$\alpha$%.

As indicated in the above table and FIG. 5, the pitch converting operation by the pitch converting unit 32 is canceled by setting the pitch conversion control signal SPT to the ground-level potential, so that when the output of the EX-OR circuit 86 becomes "H", the pitch conversion control signal SPT may be set to the ground level.

As a consequence, since the output of the EX-OR circuit 86 is applied to the base of the transistor Q2, when the output from the EX-OR circuit 86 becomes "H", the transistor Q2 is turned ON to cause the potential of the terminal 88 to be set to the ground level.

It should be noted that if the output of the operational amplifier 87a is directly connected to the terminal 88, then the output potential of the operational amplifier 87a fed to the comparators 82c and 82d is also lowered when the transistor Q2 is turned ON. Then, any adverse influence given to the comparators 82c and 82d may be eliminated by connecting the output of the operational amplifier 87a to the terminal 88 via a resistor R840 having a sufficiently smaller resistance than the input impedance of the terminal 88, which is the control input terminal of the pitch converting unit 32.

As described above, in accordance with this embodiment, since the pitch conversion control signal is produced from the motor drive signal and the pitch converting process in the auto mode is executed, the previously used rotation frequency detecting mechanism, such as FG, is no longer required, and a further increase in the circuit scale and total number of components can be avoided.

Figure 14:
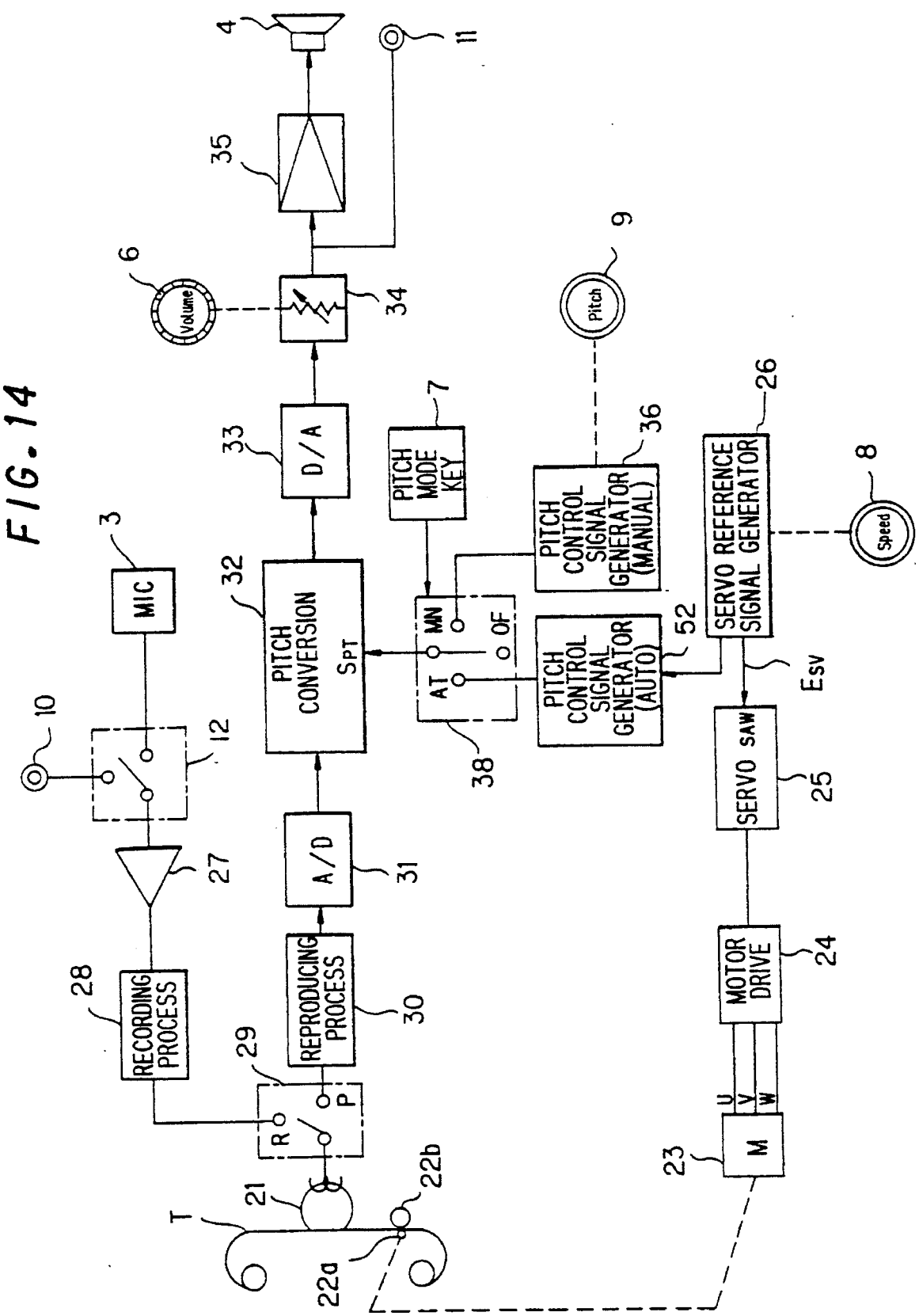
FIG. 14 is a block diagram of a major portion according to a second embodiment of the present invention.

In the second embodiment of the present invention the pitch control signal is produced by employing a rotation frequency control signal for controlling the rotation frequency of the motor, which sets the tape drive speed, and this second embodiment is shown in FIG. 14. The same reference numerals shown in the first embodiment of FIG. 1 are employed to denote the same circuit elements in this drawing and explanations thereof are omitted.

Figure 15:
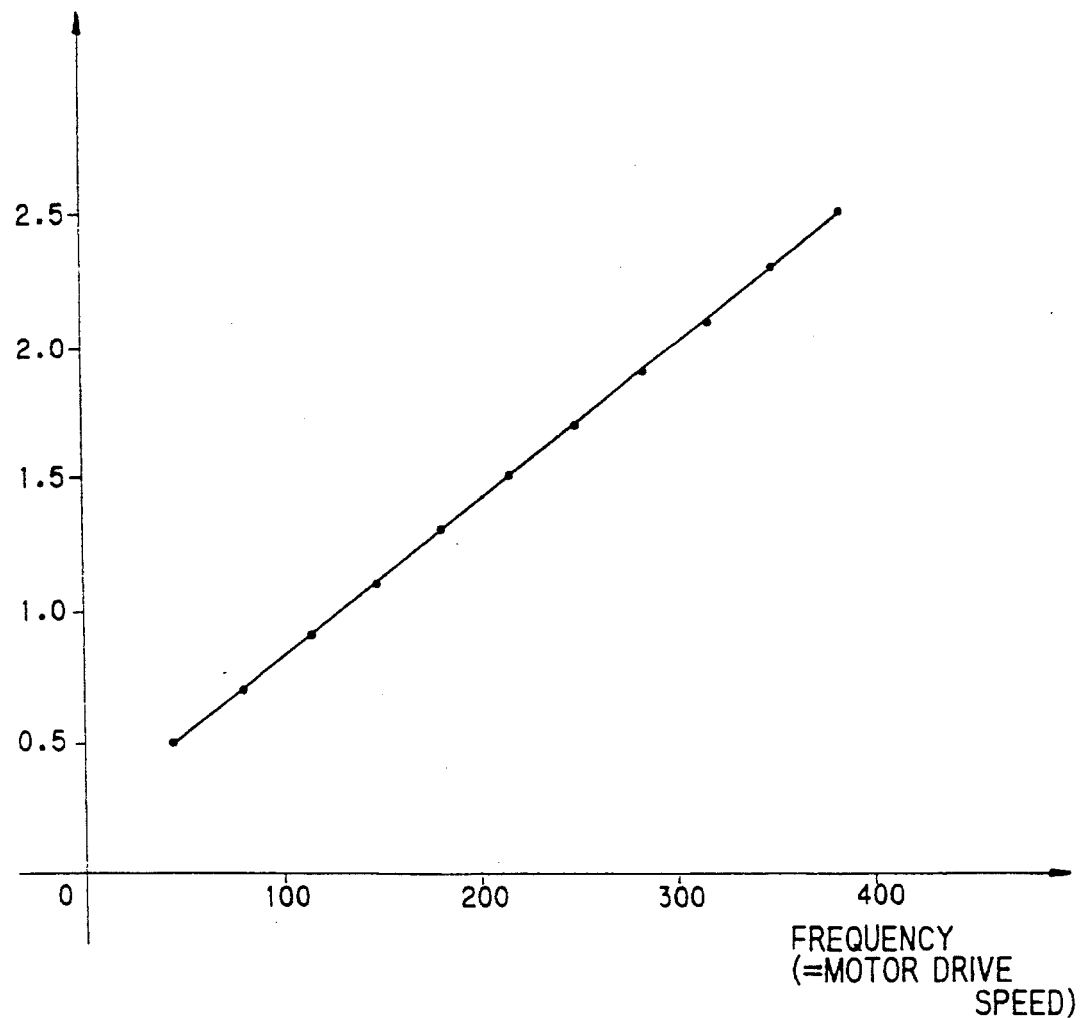
FIG. 15 is a plot showing the relation between voltage and frequency as found in the servo reference signal in the circuit of FIG. 14.

In this case, due to the auto-mode control, a signal must be provided to the pitch control signal generating unit 52 that is a voltage value proportional to the number of motor revolutions similar to that shown in FIG. 4. However, since the pulse generating unit 50 and the f/V converting unit 51, which were included in the FIG. 1 embodiment, are not employed in this embodiment, a signal that is a voltage value proportional to the number of motor revolutions is derived from the servo reference signal generating unit 26 under control of the speed control knob 8 and is applied to the pitch control signal generating unit 52. The frequency-voltage relation is shown in FIG. 15.

Figure 16:
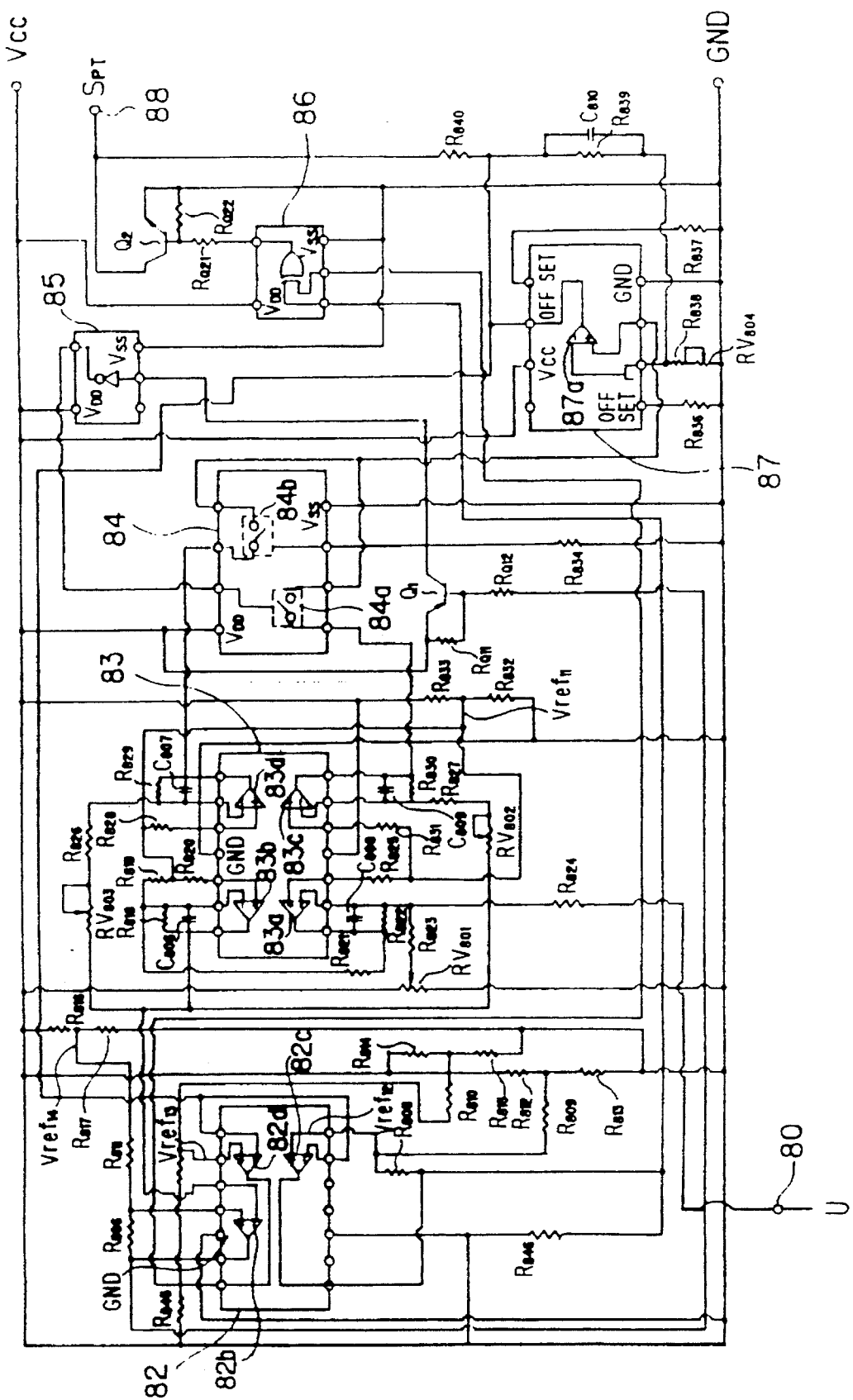
FIG. 16 is a circuit diagram of the pulse generating unit of the second embodiment.

FIG. 16 shows the pitch control signal generating unit 52 in which the servo reference signal is supplied directly to input terminal 80 from the servo reference signal generating unit 26. The construction of the pitch control signal generating unit 52 shown in FIG. 16 is exactly the same as that shown in FIG. 5, which differs from FIG. 16 in that the pulse generating unit 50 and f/v converting unit 51 are not shown in FIG. 16.

First of all, the servo system and the servo reference signal generating unit 26 according to this second embodiment will be described. As the servo system of the second embodiment, the servo reference signal generating unit 26 generates an RC time constant in correspondence with the user manipulation of the speed control knob 8 and this time constant is supplied as the servo reference signal to the servo circuit 25, whereby the number of revolutions, or the rotation frequency, of the motor 23 is controlled.

Operabilities in the servo reference signal generating unit can be improved by eliminating the user's sense of incongruity caused by differences between the manipulating amount of the speed control knob 8 and the amount the tape speed actually changes in the following manner. The variable resistor corresponding to the manipulation of the speed control knob 8 is not directly employed as the RC time constant circuit that varies the time constant, but the resistance value in the RC time constant circuit is employed as the fixed value and the charging voltage of this RC time constant circuit is varied in proportion to the manipulating amount of the speed control knob 8. As a result, a change in the resistance values of the variable resistor corresponding to the speed control knob 8 has a proportional relationship with a change in the rotational frequency of the motor 23.

It will now be explained using FIGS. 17, 18, and 19(a)–19(c) why the recharging voltage for the RC time constant circuit varies in proportion to the manipulating amount of the speed control knob 8 in the servo signal generating unit 26.

Figure 17:
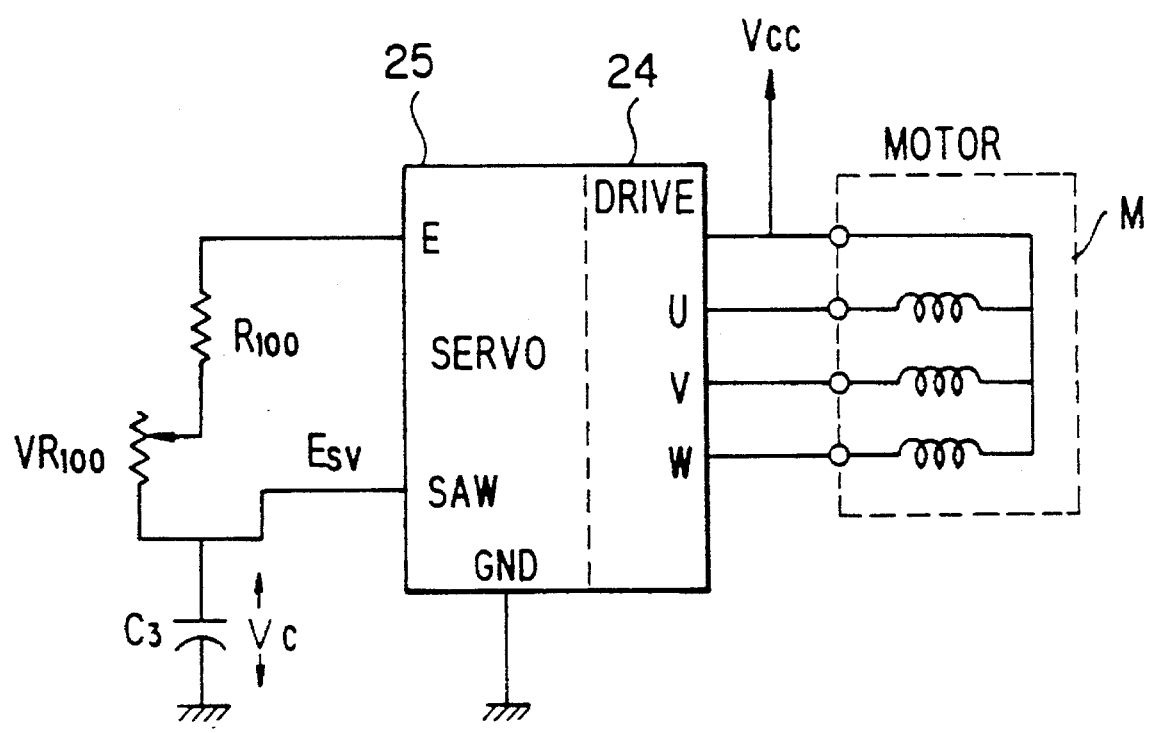
FIG. 17 is an explanatory diagram for explaining a servo system on the basis of an RC time constant variation.

FIG. 17 is a schematic diagram used to explain operations of the servo circuit 25 based on the servo reference signal. It should be understood that although the circuit of this model is different from the circuit arrangement of the previous embodiment, a variable resistor VR100 manipulated by the speed control knob 8 is directly utilized as an RC time constant setting means with respect to the RC time constant circuit constituting the servo reference signal generating unit. In other words, FIG. 17 shows a simple model in which the time constant controll is carried out by changing the resistance value without varying the charging voltage.

In this case, an E-terminal of the servo circuit unit 25 is used as a charging voltage source. A charging voltage "E" derived from the E-terminal is used to charge a capacitor C3 series-connected to ground via a resistor R100 and the variable resistor VR100. Then, a voltage Vc across the capacitor C3 is connected as a servo reference signal ESV to an SAW terminal. The servo circuit 25 controls the motor drive unit 24 by using this servo reference signal ESV as a reference, whereby the motor M is driven. It should be noted that the variable resistor VR100 corresponds to the variable resistor whose slider is moved by the speed control knob 8. In other words, the RC time constant provided by the variable resistor VR100 and the capacitor C3 can be directly changed in response to the manipulation by the user.

The operation of the servo circuit 25 that is connected corresponding to this embodiment and the model shown in FIG. 14 is explained with reference to FIG. 18. Although not shown in FIG. 17, a discharging transistor is connected to the SAW terminal within the servo circuit 25. As shown in FIG. 18, if the discharging transistor (not shown) is turned OFF at the same time that the power is started to be supplied to the V phase of the motor, the charging operation of the capacitor C3 is commenced. Then, when the voltage Vc across the capacitor C3 reaches a constant potential (VCOMP), the discharging transistor functions so that the electrons charged into the capacitor C3 are discharged. Thereafter, when the supply of power to the U phase is commenced, the charging operation of the capacitor C3 is commenced, assuming that supply of power to motor coils is performed in sequence of U, V, W, U, . . . .

As a result of such operations, sawtooth-shaped waveforms as shown at (b) in FIG. 18 are supplied as the servo reference signal ESV to the servo circuit 25. Here, time T1 is determined based on the CR charging time constant, and is expressed as:

$$T_1 = -CR \cdot \ln(1 - V_{comp}/E) \quad (2)$$

On the other hand, assuming that time T2 of FIG. 18 is equal to one half of the time T1 (T2=T1/2), a frequency F1(Hz) of the sawtooth waveform shown at (b) in FIG. 18 is expressed as:

$$F_1 = 1/(1.5 T_1) \quad (3)$$

In a servo circuit of this unit, the number of motor revolutions is controlled in response to this frequency F1.

Now, in the circuit of FIG. 17, when a change rate for the number of motor revolutions under the following conditions is calculated, it is obtained in accordance with the chart illustrated in FIG. 19. That is, the conditions assume that the variable resistor RV100 is 100 Kohms, the resistor R100 is 10 Kohms, the capacitor C100 is 0.1 microfarad, and the charging voltage E is 1.5 V, and further the comparison reference voltage VCOMP is 0.6 V, a change in the frequency F1 with respect to a change in the variable resistor RV100 is calculated, and furthermore when the frequency F1 at 50% of the moving amount of the variable resistor RV100, that is, the midpoint of the moving range in the speed control operation, is employed as the reference (100%), the above-described changing rate for the motor rotation frequency is obtained.

Figures 19A, 19B:
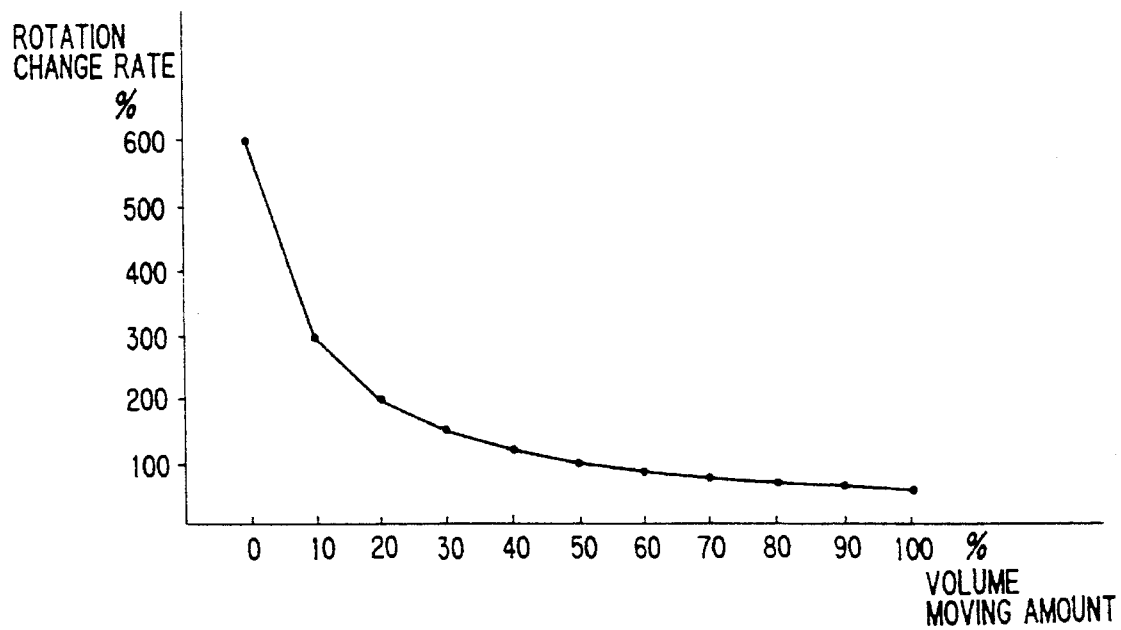
FIGS. 19(a) and 19(b) are explanatory diagrams for explaining the case that a manipulation amount and a changing rate for the number of revolutions does not represent a linear characteristic.

The relationship between the volume moving amount (operation amount) and the changing range for the motor rotation frequency is graphically shown in FIG. 19(b). As apparent from this graphic representation of FIG. 19(b), the change in the motor rotation frequencies is not uniform with respect to the moving amount of the variable resistor RV100. This implies that when the variable resistor RV100 has the B-characteristic curve where the resistance value thereof is linearly changed with regard to the rotation angles of the speed control knob 8, the number of motor revolutions is not varied linearly in response to the manipulation amount of this variable resistor by the user. For example, referring to FIG. 19(b), the number of motor revolutions is rapidly changed over the range where the manipulating amount of the variable resistor is from 0% to 20%, whereas the number of motor revolutions is not so greatly changed in the range where the manipulating amount is from 50% to 100%. As a consequence, the user feels a sense of incongruity as to the relationship between the manipulating amount and the change in the number of motor revolutions in actual use, and sometimes the user cannot easily control the number of motor revolutions to the desirable value.

Thus, in accordance with this embodiment, in the servo reference signal generating unit 26, the charging voltage is varied in response to the manipulation of the speed control knob 8, and this charging voltage is applied to the RC time constant circuit. Then, this RC time constant circuit is connected to the servo circuit 25, which is the servo circuit for performing the operations as explained with reference to FIGS. 17 and 18, so that the servo reference signal ESV having the sawtooth-shaped signal waveform shown in FIG. 18 is generated by the recharging/discharging operations. Then, the servo circuit 25 controls the rotation frequency of the motor 23 in response to the frequency F1 of this servo reference signal ESV.

With this circuit arrangement, the change in the resistance values of the variable resistor of the speed control knob 8 can have a proportional relationship with the change in the rotation frequencies of the motor means, see FIG. 20(b), whereby the user's sense of incongruity in operation that occurs based on the difference between the manipulating amount of the speed control knob 8 and the actual amount of the change in tape drive speed can be eliminated, thereby improving the overall operability of the system.

Figure 21:
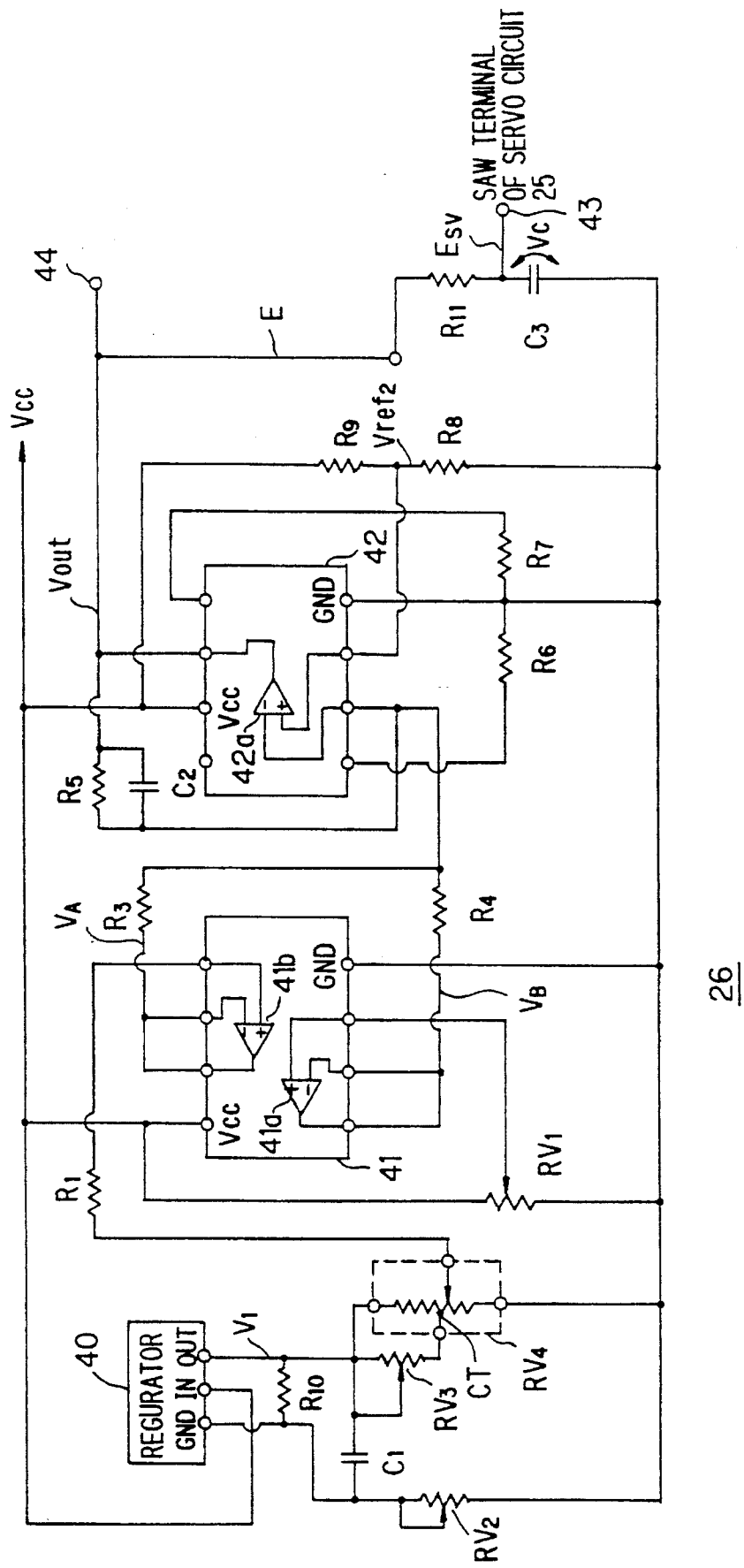
FIG. 21 is a circuit diagram of a servo reference signal generating unit of a second embodiment.

FIG. 21 is a circuit diagram of the servo reference signal generating circuit 26 according to this embodiment, in which the charging voltage applied to the RC time constant circuit is varied in correspondence with the manipulation amount of the speed control knob 8. In FIG. 21, RV4 is a variable resistor that is operated by the speed control knob 8, and the resistance value of this variable resistor is varied in response to the rotary operation of the speed control knob 8. In other words, the servo reference signal ESV for controlling the speed is produced in accordance with the resistance value of the variable resistor RV4, and this servo reference signal is output from the servo reference signal generating circuit 26 and fed to the servo circuit 25.

Reference numeral 40 shows a voltage regulator, reference numeral 41 indicates a buffer containing amplifiers 41a and 41b, and reference numeral 42 denotes an adder having an amplifier 42a.

The power source voltage Vcc is applied to the input terminal of the voltage regulator 40. A voltage V1 appearing between the output terminal of the voltage regulator 40 and the ground terminal is set by a resistor R10 and a capacitor C1 and is used as a fixed voltage output. The voltage value of the fixed output voltage is adjustable by way of a variable resistor RV2. The output voltage V1 of the voltage regulator 40 is subdivided by a variable resistor RV4, and then the subdivided voltage is entered via a resistor R1 to the amplifier 41b of the buffer 41. The power source voltage Vcc is subdivided by the variable resistor RV1 and the subdivided voltage is applied to the amplifier 41a of the buffer 41. That is, a DC potential $V_A$ adjusted by the variable resistor RV4 is produced as the output of the amplifier 41b, whereas another DC potential $V_B$ adjusted by the variable resistor RV1 is produced as the output of the amplifier 41a. It should be noted that for the actual value of this DC potential $V_A$, an arbitrary value can be obtained by the variable resistor RV2. The DC potentials $V_A$ and $V_B$ are applied via resistors R3 and R4 to the inverting input terminal of the adder amplifier 42a of the adder 42. A voltage Vref2 set by resistors R9 and R8 is applied to the non-inverting input terminal of the adder amplifier 42a.

The output voltage Vout of this adder amplifier 42a can be expressed as:

$$V_{out}=V_{ref2}+[(V_{ref2}-V_A)+(V_{ref2}-V_B)] \quad (4)$$

This output voltage Vout becomes the charging voltage E that is applied to the time constant circuit constructed of resistor R11 and capacitor C3. As previously explained in relation to FIGS. 14 and 15, the voltage across the capacitor C3 to which the charging operation and the discharging operation are performed, is applied to the SAW terminal of the servo circuit 25. The situation may be conceived in which there is no variable resistor RV3 parallel-connected between the center tap CT of the variable resistor RV4 and the hot side thereof in FIG. 21. In which case, as the DC potential $V_A$, such potentials between 0V and the potential V1 appear which is proportional to the moving amount of the variable resistor RV4, that is, the rotation angle of the speed control knob 8.

From the above-described equation (4), the following equation (5) may be induced.

$$V_{out}=3 \cdot V_{ref2}-V_B-V_A \quad (5)$$

Since (3 Vref2−VB) contained in equation (5) is a constant that is not influenced by the DC potential $V_A$, the output voltage Vout may be varied from (3Vref2−$V_B$) to (3Vref2−$V_B$−V1) by changing the DC potential $V_A$ between 0V and the potential V1.

As previously explained, since the DC potential $V_A$ corresponds to a voltage produced by subdividing the voltage V1 by using the variable resistor RV4, when a variable resistor having the B-characteristic curve is employed as the variable resistor RV4, a voltage is obtained that is proportional to the moving amount of the variable resistor RV4 as the DC potential $V_A$. As a result, a voltage proportional to the moving amount of the variable resistor RV4 can be obtained as the output voltage Vout, which is the charging voltage E.

When the voltage waveform across the capacitor C in the RC time constant circuit is applied as the servo reference signal ESV to the servo circuit 25 while the charging voltage E is varied in a proportional fashion in correspondence with the manipulation amount, a proportional relationship may be established between the manipulating angle of speed control knob 8 and the changing rate for the rotation frequency of the motor 23, and this relationship is illustrated in FIGS. 20(a) and 20(b).

For instance, it is assumed that in the above equation (1) to obtain the charging period T1 of the time constant signal corresponding to the servo reference signal, the resistance value of the resistor R is fixed (100 Kohms) and the charging voltage E is changed from 0.5 V to 2.5 V in correspondence with the moving amount of the variable resistor RV4. Further, assuming that C=0.1 microfarads and the comparing reference voltage VCOMP=0.4 V, a change in the frequencies F1 is calculated by way of equations (1) and (2) with respect to a change in the charging voltages E. In addition, when the changing rate for the number of motor revolutions is calculated under the condition that the frequency F1 obtained when the charging voltage E=1.5 V is recognized as a reference (100%), the resultant changing rate is obtained as shown by the table in FIG. 20(a). A relationship between the manipulating amount of the variable resistor RV4 and the changing rate for the number of motor revolution is graphically represented in FIG. 20(b).

In other words, a linear characteristic as shown in FIG. 20(b) can be obtained as the characteristic about the changing range for the number of motor revolutions with respect to the manipulation of the speed control knob 8 in this embodiment, so that the operability is easily grasped by the user.

The above-described explanation has been made based on the assumption that the variable resistor RV3 is not present. Now, the presence and function of the variable resistor RV3 will be described.

Typically, at the time the tape recorder is manufactured and when the tape drive speed can be controlled by the user, as described above, it is preferable that when the speed control knob 8 is located at the center position, that is, position "N" in FIG. 2, the rated tape drive speed is normally set, and further the tape drive speed may be doubled along the direction toward the high-drive speed, taking account of the actual operation modes. It is not necessarily required, however, that the tape drive speed be multiplied by −2 along the direction toward the low-speed drive. For example, when the rated speed is selected to be 100%, it is sufficient to vary the tape drive speed up to approximately 70%. Moreover, the speed setting operation may sometimes provide easy manipulations by the user of the tape recorder.

In other words, there are some possibilities in which the speed changing amount that is achieved when the speed control knob 8 is turned to the (+) side is greater than that achieved when the speed control knob 8 is turned to the (−) side. In this case, for instance, the characteristic as indicated by a solid line of FIG. 20(c) is set.

In case of the characteristic shown by the solid line shown in FIG. 20(c), the rated speed in which the changing rate for the number of revolutions is set to 100% can be obtained at the position "N" of 50% of the moving amount, and approximately a 2×speed higher than the rated speed can be achieved at the position (+) of 0% of the moving amount. On the other hand, approximately 70% speed (30% reduced speed) lower than the rated speed can be achieved at the position (−) of the speed control moving amount.

Assuming now that as described above no variable resistor RV3 is employed, the changing rate for the rotation frequency is variable between approximately 70% to 20% in response to the manipulation of the variable resistor RV4, and also the tape drive speed is controlled in accordance with this manipulation, so that a characteristic such as shown by a dot/dash line in FIG. 20(c) results.

In this case, when the speed control knob 8 is located at the position "N" of 50% of the speed control moving amount, the tape drive speed is brought into a faster drive speed than the rated speed.

Thus, the achieve the characteristic indicated by the solid line of FIG. 20(c), the voltage $V_A$ at the position "N" is required to be increased. To this end, a variable resistor RV3 shown in FIG. 14 is parallel connected between the center tap CT of the variable resistor RV4 and the hot side thereof.

Figure 22:
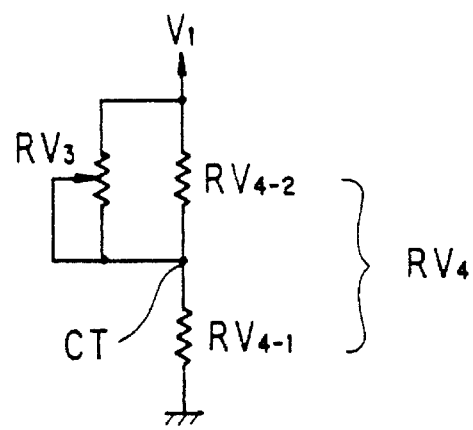
FIG. 22 is an explanatory diagram for explaining the case in which a resistor means is parallel-connected between one end of a drive operating control and a center tap thereof in the second embodiment.

As a result, as shown in the circuit of FIG. 22, the variable resistor RV4 is divided by the center tap CT into resistors RV4-1 and RV4-2 (RV4-1=RV4-2). A voltage appearing at the center tap CT is equal to a voltage subdivided by the combined resistance value of the variable resistor RV3 and the resistor RV4-2, and the resistance value of the resistor RV4-1.

Here, since RV4-1=RV4-2, the resistance value of the combined resistor established between the resistance value of the variable resistor RV3 and the resistance value of the resistor RV4-2 becomes lower than the resistance value of the resistor RV4-1, so that the voltage appearing at the center tap position can be increased. At this time, it is, of course, possible to control the voltage changing amount by the variable resistor RV3.

Then, since the center tap position corresponds to the position "N" of the speed control knob 8, the characteristic as indicated by a solid line of FIG. 20(c) can be obtained.

It should be understood that even when the variable resistor RV3 is employed, as explained above, the linearity of the DC potential $V_A$ with regard to the moving amount of the variable resistor RV4 caused by manipulation of speed control knob 8 can be maintained.

Figure 23:
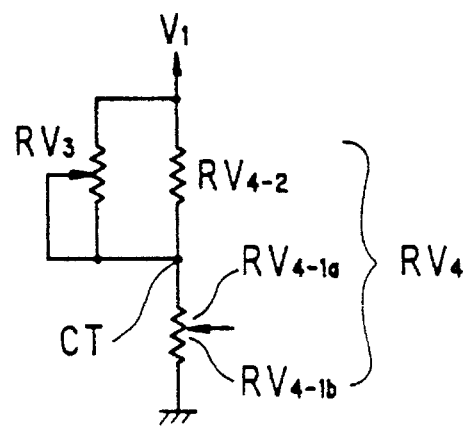
FIG. 23 is an explanatory diagram for explaining the case that a resistor is parallel-connected between one end of the speed change resistor and a center tap thereof in the second embodiment.

When, for instance, the variable resistor RV4 is manipulated toward the ground side rather than the center tap CT side, the circuit of FIG. 22 becomes the circuit as shown in FIG. 23. The DC potential $V_A$ is equal to the voltage subdivided by a resistance value of a series connection between the combined resistance between the variable resistor RV3 and the resistor RV4-2, and the resistor RV4-1a, and also the resistor RV4-1b. Namely, the DC potential $V_A$ is equal to a voltage defined in accordance with the moving amount of the resistor RV4-1a.

Figure 24:
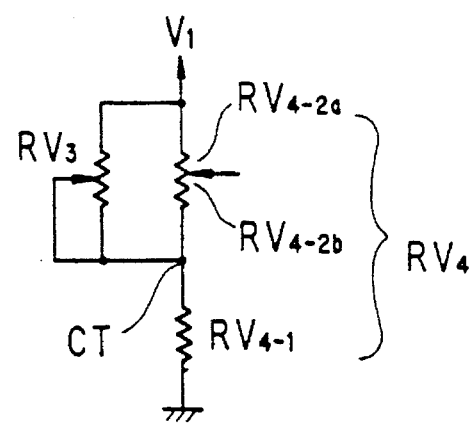
FIG. 24 is an explanatory diagram for explaining the case that a resistor is parallel-connected between one end of the speed change resistor and a center tap thereof in the second embodiment.

Also, when the variable resistor RV4 is manipulated on the side of the voltage V1 from the center tap CT, the circuit becomes the circuit shown in FIG. 24. The DC potential $V_A$ becomes a voltage obtained by subdividing the voltage V1 by the resistor RV4-2a and the resistor RV4-2b. Namely, the DC potential $V_A$ corresponds to the voltage in correspondence with the moving amount of the resistor RV4-2a.

If the opposite characteristic to the above-described characteristic is desirably set, namely, the speed changing amount obtained when the speed changing knob 8 is turned to the (+) side is smaller than the speed changing amount obtained when the speed changing knob 8 is turned to the (−) side, then the variable resistor RV3 may be arranged in a parallel manner between the center tap CT of the variable resistor RV4 and the ground. Alternatively, a resistor having a fixed resistance value may be arranged instead of the variable resistor RV3.

As previously described, in accordance with this embodiment, the tape drive speed is varied in a proportional form in response to the manipulation of the speed control knob 8. When the auto mode is selected as the pitch conversion mode, a preselected amount of pitch conversion is performed by the pitch converting unit 32 in response to the speed changing amount. Even when the tape speed is changed, in order that the reproduced sound with similar tones to those obtained during the rated tape drive speed can be obtained, the pitch control signal generating unit 52 derives from the servo reference signal generating unit 26, such a voltage value as represented by the signal having a characteristic shown in FIG. 4 which is changed in proportion to the changes in tape speeds as the tape drive speed information. In the servo reference signal generating unit 26 of FIG. 21, the signal linearly responding to the tape speed variation corresponds to the output voltage Vout.

As this output voltage Vout is derived from the terminal 44 of FIG. 21, the present motor rotation frequency information, which is the tape drive speed information, can be obtained. As previously explained in relation to FIG. 12, the pitch control signal generating unit 37 which becomes the voltage value of column(a) is produced in response to the number of motor revolutions represented in column(e), so that the pitch converting process in the auto mode is executed.

It should be noted that since the voltage value derived from the terminal 44 corresponds to the output of the f/v conversion in the first embodiment, the circuit arrangement of the pitch control signal generating unit 52 may be made similar to that shown in FIG. 5 except for the circuit portion constituting pulse generating unit 50 and f/v converting unit 51 in FIG. 5. It should also be noted that since the potential obtained from the output of the f/v converting unit 51 in the first embodiment is different from the potential produced from the output voltage Vout in the second embodiment, the gain of the operational amplifier employed in the pitch control signal generating unit 52 shown in FIG. 5 must be changed.

In this embodiment, as described above, the rotation frequency detecting mechanism FG and the circuit portion are not required by utilizing the output voltage Vout of the servo reference signal generating unit 26, and furthermore, increases in the circuit scale and also the number and size of the circuit components can be suppressed.

While the present invention has been described with regard to the tape recorders as the first and second embodiments, the sound reproducing apparatus according to the present invention may be applied to other various electronic appliances other than tape players, for example, DAT and disk players.

Also, the actual circuit arrangements are not limited to those of the first and second embodiments, but may be modified.

As previously described, the sound reproducing apparatus of the present invention is arranged by that the signal related to the motor rotation frequency, which is the drive signal of the motor, or the rotation frequency control signal for controlling the rotation frequency of the motor, which sets the reproducing drive signal of the recording medium, is employed to produce the pitch control signal. As a consequence, when it is so constructed that the pitch conversion is automatically performed at a preselected pitch converting amount in response to the changing amount of the reproduced drive speed, no mechanism for detecting the number of motor revolutions (reproducing drive speed) such as FG is required. Accordingly, there are various merits that total number of circuit components can be reduced, the package spacing can be reduced, and the manufacturing cost can be reduced.

What is claimed is:

1. An apparatus for producing sound data from a recording medium, comprising:

a motor for driving the recording medium;

means for generating a motor control signal to control a reproducing speed of the motor to be different than a recording speed used to record the sound data;

means for generating a pitch control signal including means for generating a frequency pulse correlative to the recording medium drive speed on the basis of the motor control signal;

means for converting the frequency pulse to a first voltage value proportional to the recording medium drive speed;

means for converting a pitch of the sound data to a predetermined pitch in accordance with the pitch control signal including a converting table representing a relation between the pitch control signal and a pitch converting amount, so that the pitch of the reproducing sound is converted to the predetermined pitch on the basis of the converting table; and means for generating a second voltage value as the pitch control signal by adjusting the first voltage value to a relation obtained by a predetermined expression between the voltage value corresponding to the pitch converting amount in the converting table and the recording medium drive speed.

2. The apparatus of claim 1, wherein the pitch control signal is a DC voltage related to a drive speed of the recording medium.

3. The apparatus of claim 1, wherein the predetermined pitch is substantially the same as the pitch of the sound data at the recording speed.

4. The apparatus of claim 1, wherein the predetermined expression is represented by:

$$f_n = 2^{2k/12} f_0$$

wherein $f_n$, $f_0$, and k mean a frequency after converting a pitch, a frequency during the rated drive speed, and the pitch converting amount, respectively.

5. The apparatus of claim 4, wherein the second voltage value generating means further comprises means for generating a discrimination signal indicating whether the drive speed is high or low on the basis of the recording drive speed;

means for modifying the pitch control signal so as to have different characteristics during a high drive speed and a low drive speed on the basis of the voltage value during the recording speed; and means for switching the characteristics in accordance with the discrimination signal.

6. The apparatus of claim 5, further comprising:

means for canceling a pitch control operation when the pitch control is within a certain range with regard to a voltage value at the recording drive speed.

7. The apparatus of claim 1, wherein the motor control signal is one signal selected from three-phase motor drive signals.

8. An apparatus for reproducing sound data from a recording medium, comprising:

a motor for driving the recording medium;

means for setting a drive speed of the recording medium;

means for generating a servo reference signal in the form of a first DC voltage value proportional to the drive speed of the recording medium for controlling a rotation frequency of the motor, the servo reference signal being correlative to the drive speed of the recording medium set by the means for setting;

means for converting a pitch of the sound data to a predetermined pitch in accordance with the pitch control signal including a converting table having data representing a relation between the pitch control signal and a pitch converting amount and the pitch of the reproducing sound is converted to the predetermined pitch on the basis of the converting table; and means for generating a pitch control to set a pitch converting amount in accordance with the servo reference signal controlling the rotation frequency by adjusting the first DC voltage value to a relation obtained by a predetermined expression between the voltage value corresponding to the pitch converting amount in the converting table and the recording medium drive speed, wherein the pitch control signal is a second DC voltage correlative to the recording medium drive speed.

9. The apparatus of claim 8, wherein the servo reference signal generating means further comprises means for modifying the servo reference signal so as to have different characteristics during a high drive speed and a low drive speed on the basis of the voltage value during a rated speed corresponding to a speed at which the sound data was recorded on the recording medium.

10. The apparatus of claim 9, wherein the servo reference signal modifying means for modifying the servo reference signal so that a changing rate of the voltage value during the high drive speed is greater than that during the low drive speed.

11. The apparatus of claim 8, wherein the predetermined pitch in substantially the same as the pitch during a rated drive speed.

12. The apparatus of claim 8, wherein the predetermined expression is represented by:

$$f_n = 2^{2k/12} f_0$$

wherein $f_n$, $f_0$, and k represent a frequency after converting a pitch, a frequency during the rated drive speed, and the pitch converting amount, respectively.

13. The apparatus of claim 12, wherein the pitch control signal generating means further comprises means for generating a discrimination signal indicating whether the drive speed is high or low on the basis of the rated drive speed;

means for modifying the pitch control signal so as to have different characteristics during a high drive speed and a low drive speed on the basis of the voltage value during the rated speed; and means for switching the characteristics in accordance with the discrimination signal.

14. The apparatus of claim 13, further comprising:

means for canceling a pitch control operation when the pitch control is within a certain range with regard to a voltage value at the rated drive speed.

* * * * *